(12) United States Patent
Komaki et al.

(10) Patent No.: US 8,873,973 B2
(45) Date of Patent: Oct. 28, 2014

(54) DIGITAL COHERENT RECEIVER AND PHASE CONTROL METHOD

(75) Inventors: Kosuke Komaki, Kawasaki (JP); Hisao Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 222 days.

(21) Appl. No.: 13/446,177

(22) Filed: Apr. 13, 2012

(65) Prior Publication Data
US 2012/0308227 A1    Dec. 6, 2012

(30) Foreign Application Priority Data
May 31, 2011  (JP) ................................ 2011-122775

(51) Int. Cl.
| H04B 10/06 | (2006.01) |
| H04B 10/2569 | (2013.01) |
| H04B 10/2507 | (2013.01) |
| H04B 10/69 | (2013.01) |

(52) U.S. Cl.
CPC ...... H04B 10/25073 (2013.01); H04B 10/2569 (2013.01); H04B 10/6971 (2013.01)
USPC ............................. 398/206; 398/204; 398/202

(58) Field of Classification Search
CPC ......... H04B 10/60; H04J 14/06; H04L 7/027; H04L 7/033; H04L 27/227; H04L 2027/0067
USPC .................. 398/202–214, 154–155
See application file for complete search history.

(56) References Cited

U.S. PATENT DOCUMENTS

| 4,334,313 | A | * | 6/1982 | Gitlin et al. | .................. | 375/355 |
| 5,479,446 | A | * | 12/1995 | Mourot | .................. | 375/243 |
| 5,867,542 | A | * | 2/1999 | Iwamatsu et al. | ............. | 375/354 |
| 7,522,841 | B2 | * | 4/2009 | Bontu et al. | .................. | 398/154 |
| 7,636,525 | B1 | * | 12/2009 | Bontu et al. | .................. | 398/208 |
| 7,747,169 | B2 | | 6/2010 | Koc | | |
| 7,835,387 | B2 | * | 11/2010 | Agazzi et al. | ................. | 370/463 |

(Continued)

FOREIGN PATENT DOCUMENTS

| EP | 2273703 A1 * | 1/2011 |
| JP | 2011-009956 | 1/2011 |
| WO | WO-2008/088522 | 7/2008 |

OTHER PUBLICATIONS

Miller, The Method of Least Squares, 2006, Mathematics Department Brown University, pp. 1-7.*

(Continued)

*Primary Examiner* — Ken Vanderpuye
*Assistant Examiner* — Dibson Sanchez
(74) *Attorney, Agent, or Firm* — Fujitsu Patent Center

(57) ABSTRACT

A digital coherent receiver includes a sampling phase detector to detect a phase of a sampled digital signal, and a phase adjustor to adjust the sampling phase of the digital signal based upon the detected phase. The phase detector includes filters to equalize the digital signal with different equalization characteristics; sensitivity monitoring phase detectors, each connected to one of the filters and outputting a phase detection signal representing the phase of the output signal from the associated filter together with a sensitivity monitoring signal representing the sensitivity of the phase detection; sensitivity correction coefficient generators, each generating a sensitivity correction coefficient for correcting the associated phase detection signal using a square sum of the sensitivity monitoring signals; and an adder to add the phase detection signals that have been corrected by the sensitivity correction coefficients, and output a phase signal.

16 Claims, 23 Drawing Sheets

(56) References Cited

U.S. PATENT DOCUMENTS

| | | | |
|---|---|---|---|
| 7,894,728 B1* | 2/2011 | Sun et al. | 398/208 |
| 7,936,999 B1* | 5/2011 | Hawryluck et al. | 398/206 |
| 8,244,142 B2* | 8/2012 | Wagner et al. | 398/208 |
| 8,401,403 B2* | 3/2013 | Rollins et al. | 398/208 |
| 2006/0285855 A1* | 12/2006 | Sun et al. | 398/155 |
| 2009/0317092 A1* | 12/2009 | Nakashima et al. | 398/204 |
| 2010/0329677 A1* | 12/2010 | Kaneda et al. | 398/65 |
| 2010/0329697 A1 | 12/2010 | Koizumi et al. | |
| 2010/0329698 A1* | 12/2010 | Nakashima | 398/208 |
| 2011/0081152 A1* | 4/2011 | Agazzi et al. | 398/135 |
| 2011/0170881 A1* | 7/2011 | Nakashima et al. | 398/209 |
| 2012/0121274 A1* | 5/2012 | Fludger | 398/208 |
| 2012/0308234 A1* | 12/2012 | Bianciotto et al. | 398/65 |

OTHER PUBLICATIONS

F. M. Gardner, "A BPSK/QPSK Timing-Error Detector for Sampled Receivers,", IEEE Trans. on Communications, vol. COM-34, No. 5, pp. 423-429 (May 1986.).

* cited by examiner

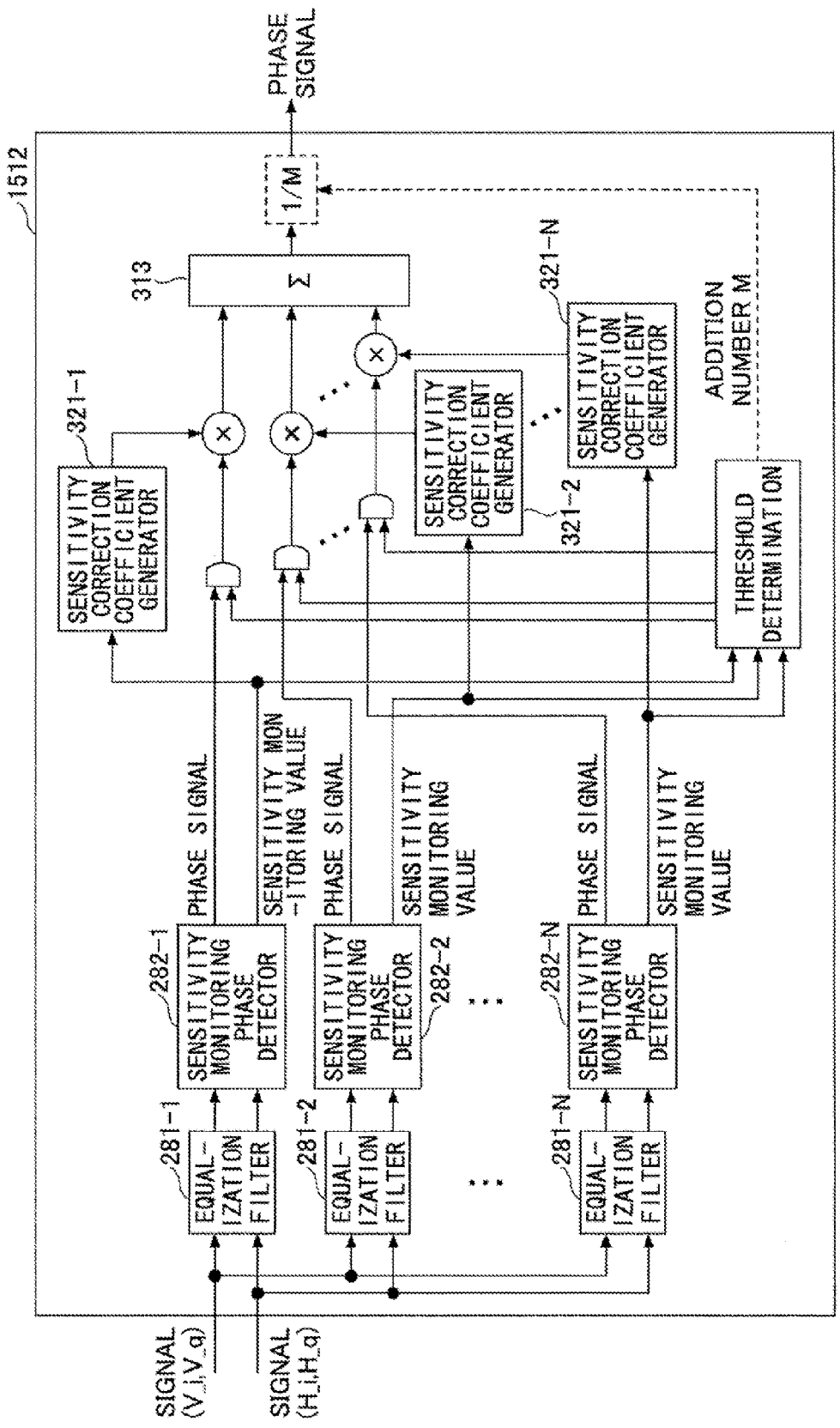

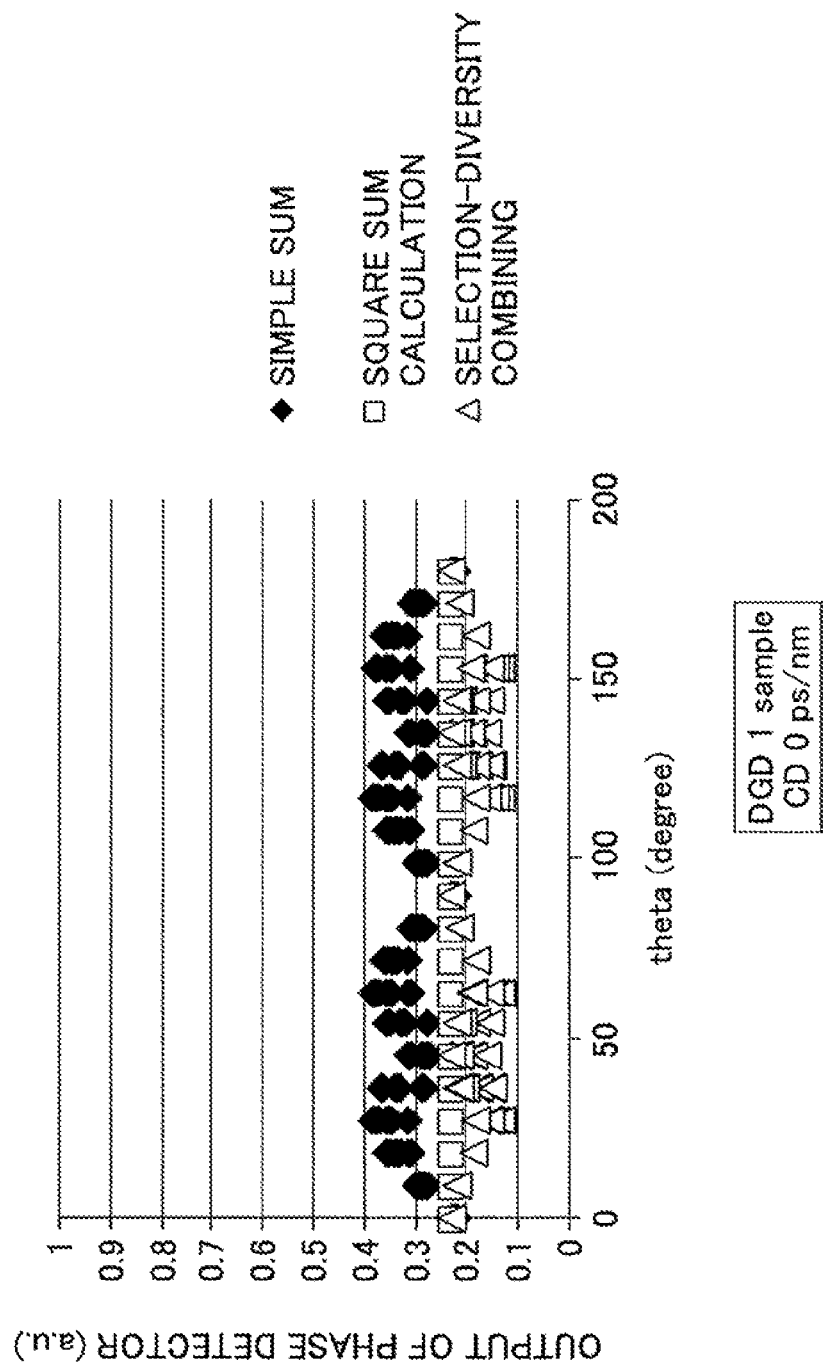

FIG.19

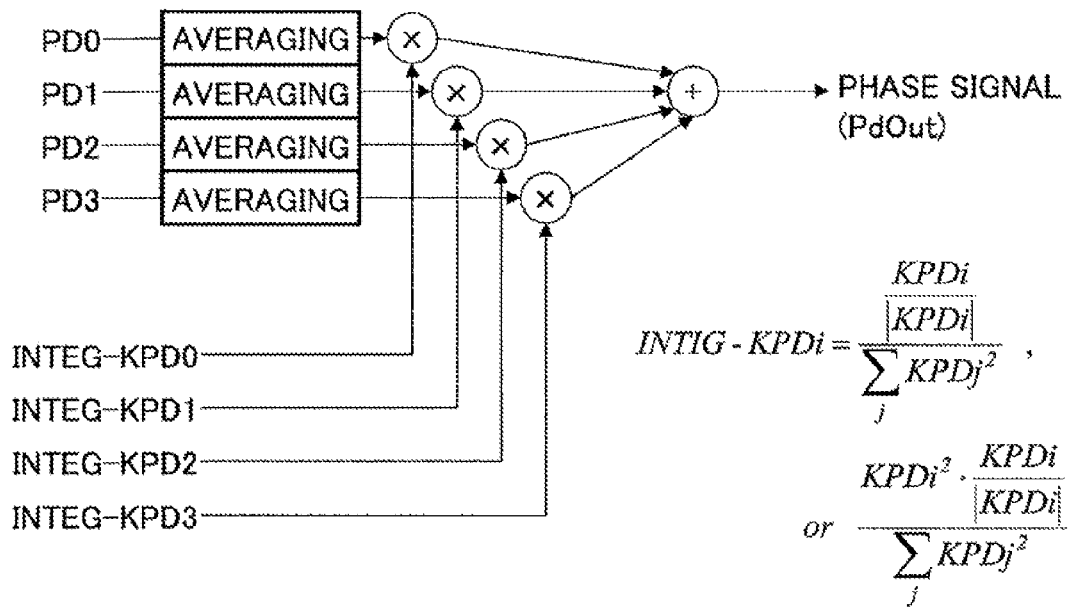

(A) CORRECT SENSITIVITY ON EACH PD USING SQUARE SUM OF
ALL PD OUTPUTS $$PdOut = \sum_i PDi \cdot [INTIG\text{-}KPDi] = \frac{\sum_i PDi \cdot \frac{KPDi}{|KPDi|}}{\sum_j KPDj^2}$$

(B) CORRECT SENSITIVITY BY SQUARING EACH OF THE PD OUTPUTS
AND PERFORM MAXIMUM RATIO COMBINING USING THE
RESPECTIVE SQUARE VALUES WITH RESPECT TO THE SQUARE
SUM OF THE SENSITIVITIES $$PdOut = \sum_i PDi \cdot INTIG\text{-}KPDi = \sum_i \left[ PDi \cdot \frac{KPDi^2 \cdot \frac{KPDi}{|KPDi|}}{\sum_j KPDj^2} \right]$$

DIGITAL COHERENT RECEIVER AND PHASE CONTROL METHOD

CROSS REFERENCE TO RELATED APPLICATIONS

This application is based upon and claims the benefit of priority of the prior Japanese Patent Application No. 2011-122775 filed on May 31, 2011, the entire contents of which are incorporated herein by references.

FIELD

The embodiments discussed herein relate to a digital coherent receiver and a phase control method.

BACKGROUND

In ultra-high rate optical communications, in order to resolve an insufficient optical signal to noise ratio (OSNR) and linear distortion such as wavelength dispersion, coherent detection and digital signal processing using analog-to-digital converters (ADCs) are becoming mainstream in place of conventional direct demodulation. Because of ultra-high data rates, oversampling of analog-to-digital conversion may not be affordable due to hardware limitation; therefore, it is demanded to sample data at the most suitable timing to satisfy a required signal quality. A method for optimizing phase compensation is proposed, in which method sampling is carried out at a frequency twice the symbol frequency and phase offset from the optimum sampling point is observed using a Gardner's phase detector (see, for example, Japanese Laid-open Patent Publication 2011-9956).

FIG. 1A is a schematic diagram of a known structure of a digital coherent receiver 1000. Signal light from an optical transmission path and local oscillator light are detected and the detection result is converted into an electric signal which is referred to as an O/E converted signal. The O/E converted signal is input to a digital converter 1150. The digital converter 1150 performs digital sampling on the O/E converted analog signal synchronized with a clock signal generated by a frequency variable oscillator 1140. The digitally sampled signal is subjected to signal processing at a digital signal processor 1160. In the digital signal processor 1160, waveform distortion is compensated for at a waveform distortion compensator 1161; digital phase compensation is carried out at a phase controller 1162; and adaptive equalization of distortion (i.e. compensation for waveform distortion) and demodulation are carried out at an adaptive equalization type demodulator 1163.

The distortion compensated input signal further undergoes phase compensation at a phase adjustor (PHA) 1511 of the phase controller 1162 and is supplied to a phase detector (PD) 1512, as well as to the adaptive equalization type demodulator 1163. The PD 1512 detects a phase shift from the optimum sampling point based upon an output of the phase adjustor 1511. The detected phase signal is fed back to the phase adjustor 1511 through a first digital loop filter (DLF) 1513 and also to a frequency variable oscillator 1140 through the first DLF 1513 and a second DLF 1514.

Influence of high-rate phase fluctuation (jitter) and fluctuation of local oscillator light are removed by feeding the phase signal back to the phase adjustor 1511, which includes finite impulse response (FIR) filters. Low-rate fluctuation such as wander is removed by feeding the phase signal back to the frequency variable oscillator 1140.

When a Gardner's phase detector is employed in the phase detector 1512, phase detection sensitivity decreases. The reasons for this may be explained as follows. The phase of a symbol changing point cannot be determined due to inter-symbol interference caused by a wavelength dispersion correction error in the compensation of waveform distortion, or the H axis component (horizontally polarized component) and a V axis component (vertically polarized component) contained in the output of the phase detector PD cancel each other because the positive sign and the negative sign are reversed between these components. If the sensitivity is lowered, the phase following capability is degraded and dephasing (out-of-phase synchronization) is likely to occur.

To compensate for the low sensitivity, the phase detector 1512 of a selection-diversity combining type illustrated in FIG. 1B is proposed. In the phase detector 1512 of the selection-diversity combining type, multiple equalization filters 281-1 through 281-N with different equalization characteristics are placed before sensitivity monitoring phase detectors 282-1 through 282-N. By using the multiple processing lines with different characteristics of equalization, the phase following capability can be maintained, even if a phase detection result is not acquired at a certain phase detector, based upon the outputs of the other phase detectors. In particular in FIG. 1B, only the phase detection signals having sensitivity monitoring levels over a threshold value are summed up at the combining part 313 to generate a phase detection signal. Consequently, an SN ratio is improved. Prior to combining the phase detection results, sensitivity correction coefficients are generated based upon the sensitivity monitoring values (at 321-1 through 321-N) and multiplied with the associated phase signals.

However, even though selection-diversity combining is employed using only those phase detection values with high sensitivities, influence of fluctuation of polarization may hardly be avoided. Therefore, there is a demand for a digital coherent receiver and a phase control method that can maintain stable control on the sampling phases regardless of polarization mode dispersion or polarization fluctuation.

SUMMARY

According to one aspect of the present disclosure, a digital coherent receiver includes a digital converter to sample a signal received from an optical transmission path and generate a digital signal; a sampling phase detector to detect a phase of the sampled digital signal; a phase adjustor to adjust a sampling phase of the digital signal based upon the detected phase; and a modulator to modulate the phase-adjusted digital signal, wherein the phase detector includes two or more filters to equalize the digital signal with different equalization characteristics; two or more sensitivity monitoring phase detectors, each connected to one of the filters and configured to output a phase detection signal representing a phase of an output signal from the associated filter and a sensitivity monitoring signal representing a sensitivity of the phase detection; two or more sensitivity correction coefficient generators, each generating a sensitivity correction coefficient for correcting the associated phase detection signal using a square sum of the sensitivity monitoring signals; and an adder to add the phase detection signals that have been corrected by the sensitivity correction coefficients and output a phase signal.

According to another aspect of the present disclosure, a phase control method is provided. The method includes sampling a signal received from an optical transmission path to generate a digital signal; inputting the digital signal to two or more filters with different equalization characteristics;

detecting a phase of an output signal from each of the filters to generate phase detection signals and sensitivity monitoring signals representing sensitivities of the associated phase detections; generating a sensitivity correction coefficient to correct the associated phase detection sensitivity using a square sum of the sensitivity monitoring signals; combining the sensitivity-corrected phase detection signals subjected to sensitivity corrections using the sensitivity correction coefficients to output a phase signal; and adjusting a sampling phase of the digital signal using the phase signal.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 1B is a schematic diagram of a phase detector used in a conventional digital coherent receiver;

FIG. 16B illustrates an advantage of the square-sum combining method according to the embodiment;

FIG. 19 illustrates other square-sum combining methods according to the embodiment.

DESCRIPTION OF EMBODIMENTS

A selection-diversity combining technique using only high-sensitivity phase detection values has a problem in that the outputs from the respective phase detectors vary depending on the condition of polarization mode dispersion. The polarization mode dispersion typically changes according to the state of polarization (SOP). If sudden fluctuation such as sudden rotation of polarization axis occurs in polarization, a correction value of each phase detector will change. In this case, a gap is produced with switching of the correction value. In particular, when the detected value has suddenly increased from a low level below the threshold value, accuracy of phase compensation decreases. This causes errors in the phase signal indicating the phase control amount, which signal is the final output of the phase detector.

Figure 2:
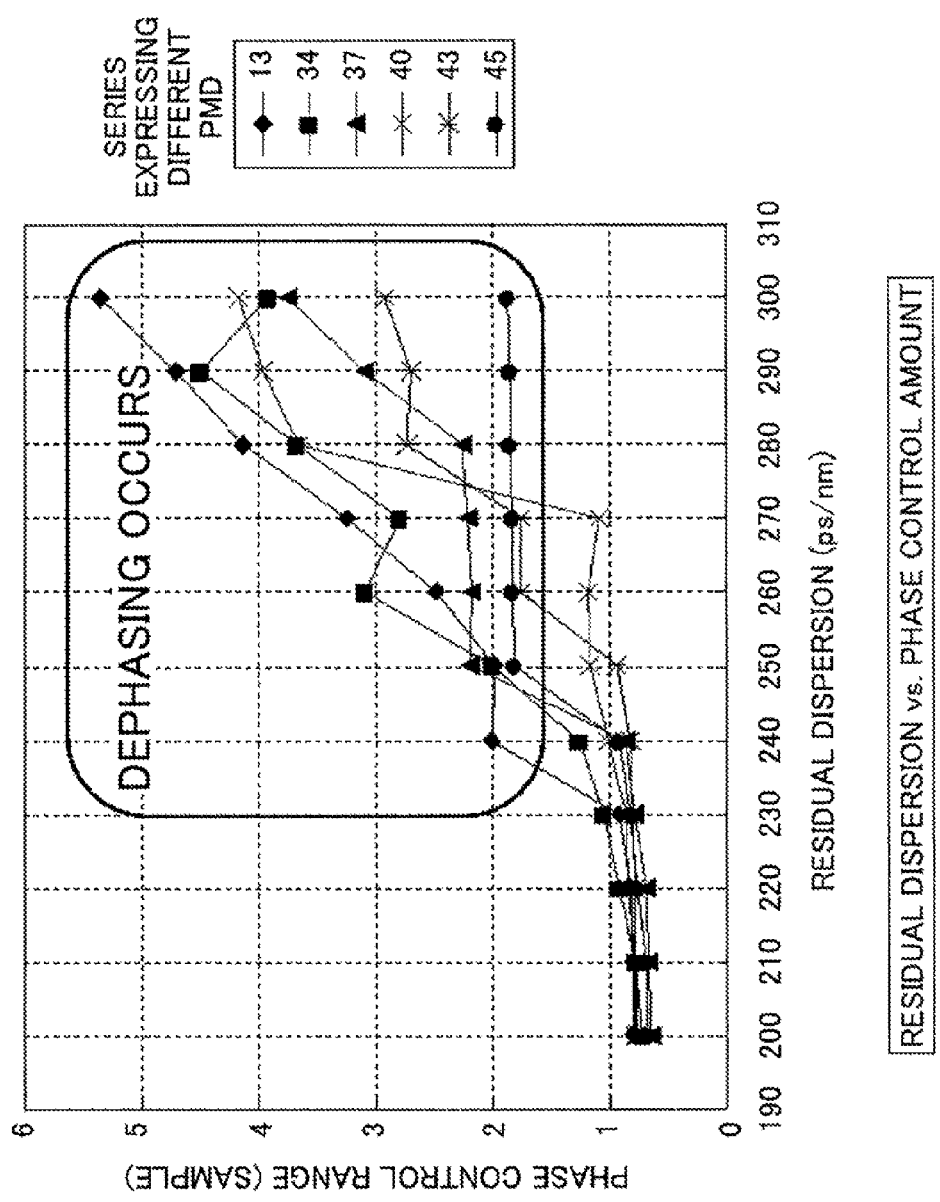
FIG. 2 illustrates a potential problem that may occur in a selection-diversity combining technique.

This issue is explained in more detail referring to FIG. 2. FIG. 2 illustrates a simulation result of the relationship between residual dispersion and phase control range, as well as the relationship between residual dispersion and signal quality (Q value). The simulation is carried out using phase detectors of a selection-diversity combining type, and the polarization state is changed variously. Due to errors generated in the resultant phase signals, dephasing and burst errors have occurred. In this case, the right amount of phase control is around 1 [sample], but sensitivity decreases when the residual dispersion increases, which results in a large error in the phase control amount.

In the following embodiments, stable sampling phase control in a digital coherent receiver is proposed. In particular, plural of equalization filters with different equalization characteristics are arranged before corresponding pairs of a phase detector and a sensitivity monitoring phase shifter to carry out phase detection of a sampling signal in a sampling phase controller of a digital signal processor. A square sum of sensitivity monitoring signals output from all the sensitivity monitoring phase shifters is used to correct the sensitivity of each of phase detection values. By using the square sum of the sensitivity monitoring signals to perform sensitivity correction, variation in sensitivity can be reduced as a whole compared to a conventional simple sum method or a selection-diversity combining method using over-threshold values. Consequently, even if polarization mode dispersion (PMD) or a polarization fluctuation occurs, fluctuation in correction is suppressed and stable phase detection is realized.

Figure 3:
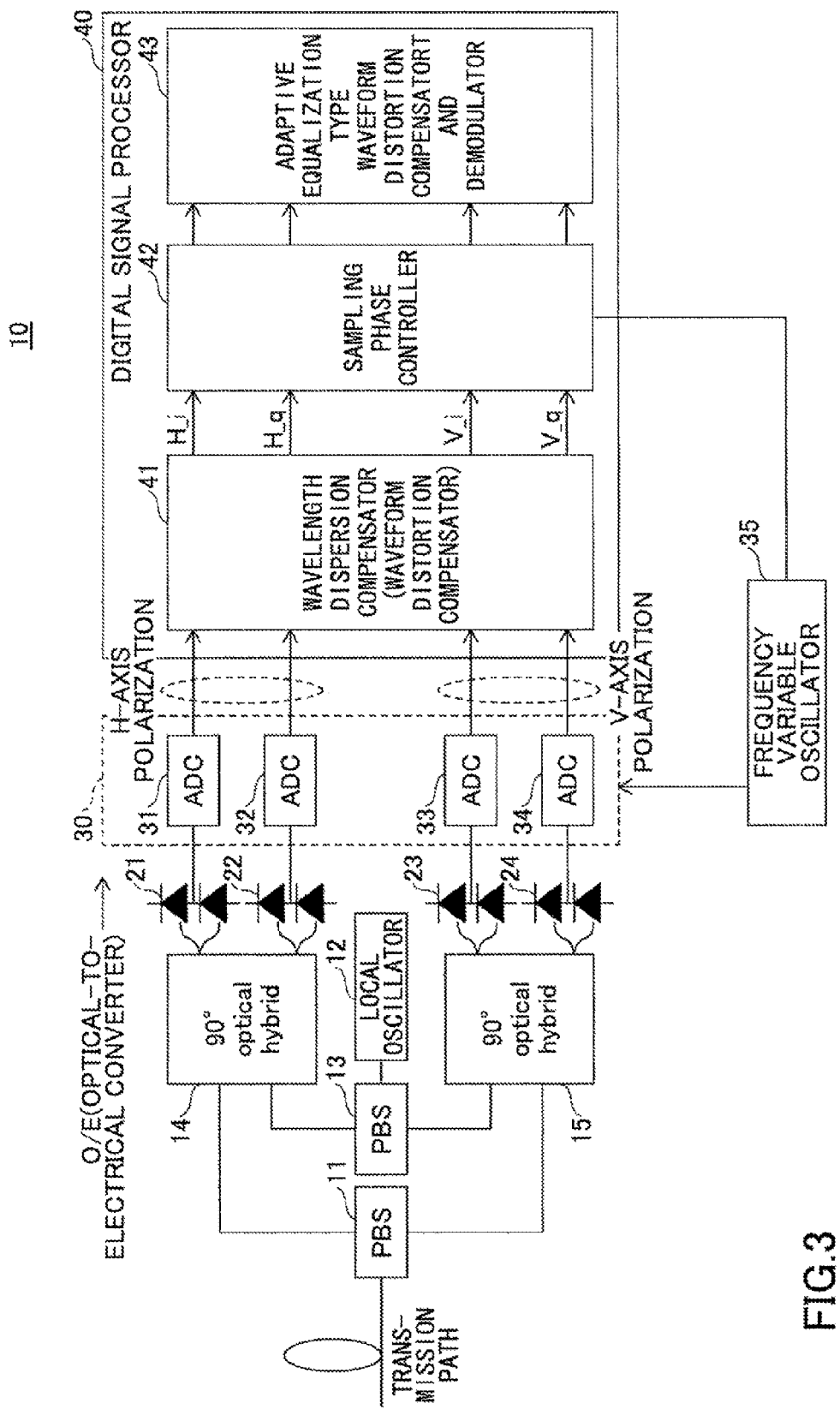
FIG. 3 illustrates an example of a digital coherent receiver to which the techniques of the present disclosure is applicable.

FIG. 3 is a schematic diagram of a digital coherent receiver of an embodiment. A signal light received through an optical transmission path is separated into a polarization component polarized along the horizontal axis (referred to as an "H-axis polarization component") and a polarization component polarized along the vertical axis (referred to as a "V-axis polarization component") by a polarization beam splitter (PBS) 11. The H-axis polarization component is input to an optical hybrid circuit (90° optical hybrid) 14, and the V-axis polarization component is input to an optical hybrid circuit (90° optical hybrid) 15. A local light emitted from a local oscillator 12 is separated by a PBS 13 and input to the optical hybrid circuits 14 and 15.

The optical hybrid circuit 14 detects the H-axis polarization component using the local oscillator light and outputs an in-phase interference component (I component) to an optical-to-electric converter 21, while outputting a quadrature interference component (Q component) to an optical-to-electric converter 22. The optical hybrid circuit 15 detects the V-axis polarization component using the local oscillator light and outputs an in-phase interference component (I component) to an optical-to-electric converter 23, while outputting a quadrature interference component (Q component) to an optical-to-electric converter 24. In this way, the received signal is separated into four channel signal lights, orthogonal phase components (I,Q) and orthogonal polarization components (H,V).

The optical-to-electric converters 21-24 such as balanced photodiodes convert phase changes of the incident signal lights to changes in the electric current intensities. Converted electronic signals are input to corresponding analog-digital converters (ADC) 31-34 of a digital converter 30. Each of the ADCs 31-34 performs digital sampling in synchronization with a clock output from a frequency variable oscillator 35. The sampling rate is, for example, 2 samples per 1 symbol (twice oversampling). In this way, the respective analog signals are converted into digital signals and parallelized to a realistic clock rate available in an LSI such as CMOS circuits. The digital signal is input to a digital signal processor 40.

The digital signal processor 40 includes a wavelength dispersion (waveform distortion) compensator 41, a sampling phase controller 42, and an adaptive equalization waveform distortion compensator and demodulator 43. The waveform distortion compensator 41, the sampling phase controller 42, and the adaptive equalization waveform distortion compensator/demodulator 43 may be implemented in a single DSP (Digital Signal Processor) or in individual DSPs.

The waveform distortion compensator 41 equalizes a waveform distortion of the digital signals output from the ADCs 31-34. The waveform distortion contained in the sampled signals is mainly due to wavelength dispersion in the optical transmission path. The sampling phase controller 42 performs digital phase compensation on the equalized signals and supplies the signals to the adaptive equalization waveform distortion compensator/demodulator 43. The phase detection result of the input signals is also fed back to the frequency variable oscillator 35 to perform clock adjustment. The adaptive equalization waveform distortion compensator/demodulator 43 compensates for the remaining waveform distortion, which is due to high-frequency fluctuations that have not been compensated for in the waveform distortion compensator 41, and demodulates the signals.

Figure 4:
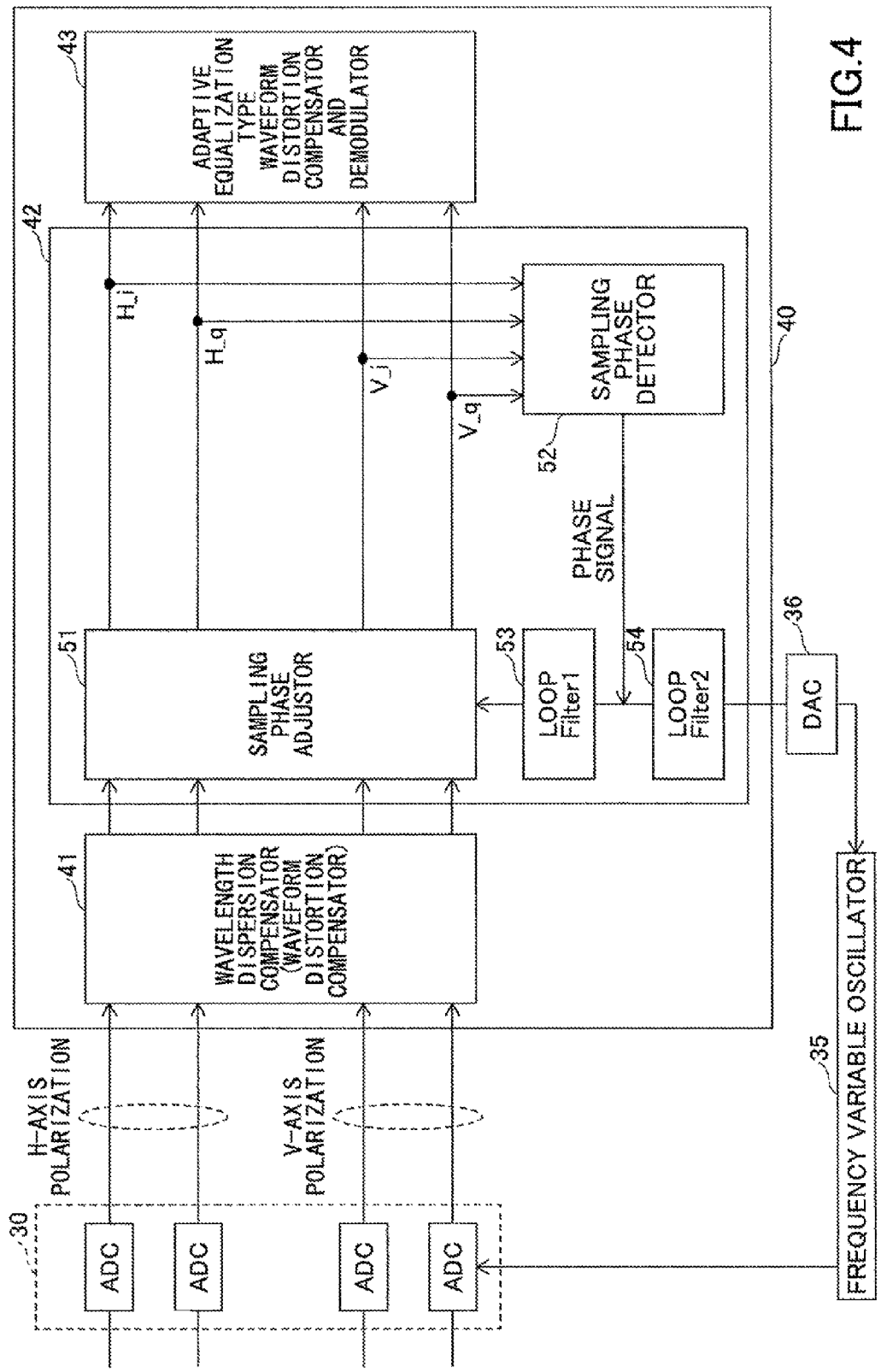
FIG. 4 is an exemplified structure of a digital signal processor of the digital coherent receiver of FIG. 3.

FIG. 4 illustrates the digital signal processor 40 in FIG. 3, especially illustrating the structure of the sampling phase controller 42. The sampling phase controller 42 includes a sampling phase adjustor 51, a sampling phase detector 52, a first loop filter 53 and a second loop filter 54.

The signals with the waveforms equalized by the waveform distortion compensator 41 are input to the sampling phase adjustor 51. The sampling phase adjustor 51 shifts and adjusts the input positions of the digital data items input in parallel to bring the phases of the sampling signals to their proper phase positions. This operation is explained in more detail below. The phase adjusted signals are input to the adaptive equalization waveform distortion compensator/demodulator 43. A part of each phase adjusted signal is also supplied to the sampling phase detector 52 to detect a phase of the sampling signals. The structure and the operations of the sampling phase detector 52 are explained below with referring to FIG. 6.

The phase signal detected by the sampling phase detector 52 is fed back to the sampling phase adjustor 51 through the first loop filter 53. The sampling phase adjustor 51 rewrites the input signal value to a value at a proper sampling phase position based upon the feedback phase signal. The first loop filter 53, the sampling phase adjustor 51 and the sampling phase detector 52 define an internal loop to lock a sampling phase.

An output signal of the sampling phase detector 52 is also input to the frequency variable oscillator 35 through the second loop filter 54 and a digital-analog converter (DAC) 36 and used for adjustment of a clock frequency. The second loop filter 54, the DAC 36, the frequency variable oscillator 35, the digital converter 30 and the sampling phase detector 52 define an external loop to lock a sampling frequency.

Figure 5:
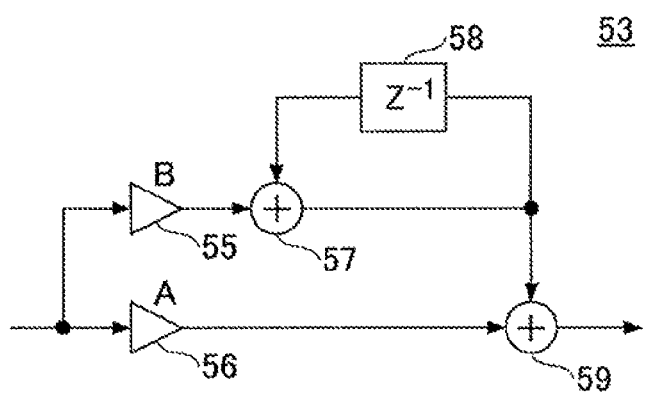
FIG. 5 illustrates an example of a loop filter used in a sampling phase controller of FIG. 4.

FIG. 5 illustrates an example of the first loop filter 53 and the second loop filter 54 used in the sampling phase controller 42 in FIG. 4. The first loop filter 53 and the second loop filter 54 have the same structure, and accordingly, only the first loop filter 53 is illustrated as an example.

The first loop filter 53 stores proportional integral (PI) control parameters and it has a first coefficient multiplier 55, a second coefficient multiplier 56, an adder 57, a delay element 58 and an adder 59. A phase signal supplied from the sampling phase controller 52 of FIG. 4 is input to the first coefficient multiplier 55 of the loop filter 53 and multiplied by a coefficient B. An output of the first coefficient multiplier 55 is connected to the input of the adder 57, in which a previous clock (a clock one clock before) is added to the input signal and the result is output as an integral term. The output of the adder 57 is connected to the input of the delay element 58 and the input of the adder 59. The delay element 58 delays the output signal of the adder 57 by one clock time of the loop filter 53, and supplies the delayed signal to the adder 57. The phase signal output from the sampling phase controller 52 is also input to the second coefficient multiplier 56 and multiplied by a coefficient A. An output of the second coefficient multiplier 56 is supplied to the adder 59 as a proportional term. The adder 59 adds the integral term and the proportional term and outputs the addition result as a phase control signal to the sampling adjustor 51. The second loop filter has the same structure and function, but the output of the adder 59 is supplied as a frequency control signal to the frequency variable oscillator 35.

Figure 6:
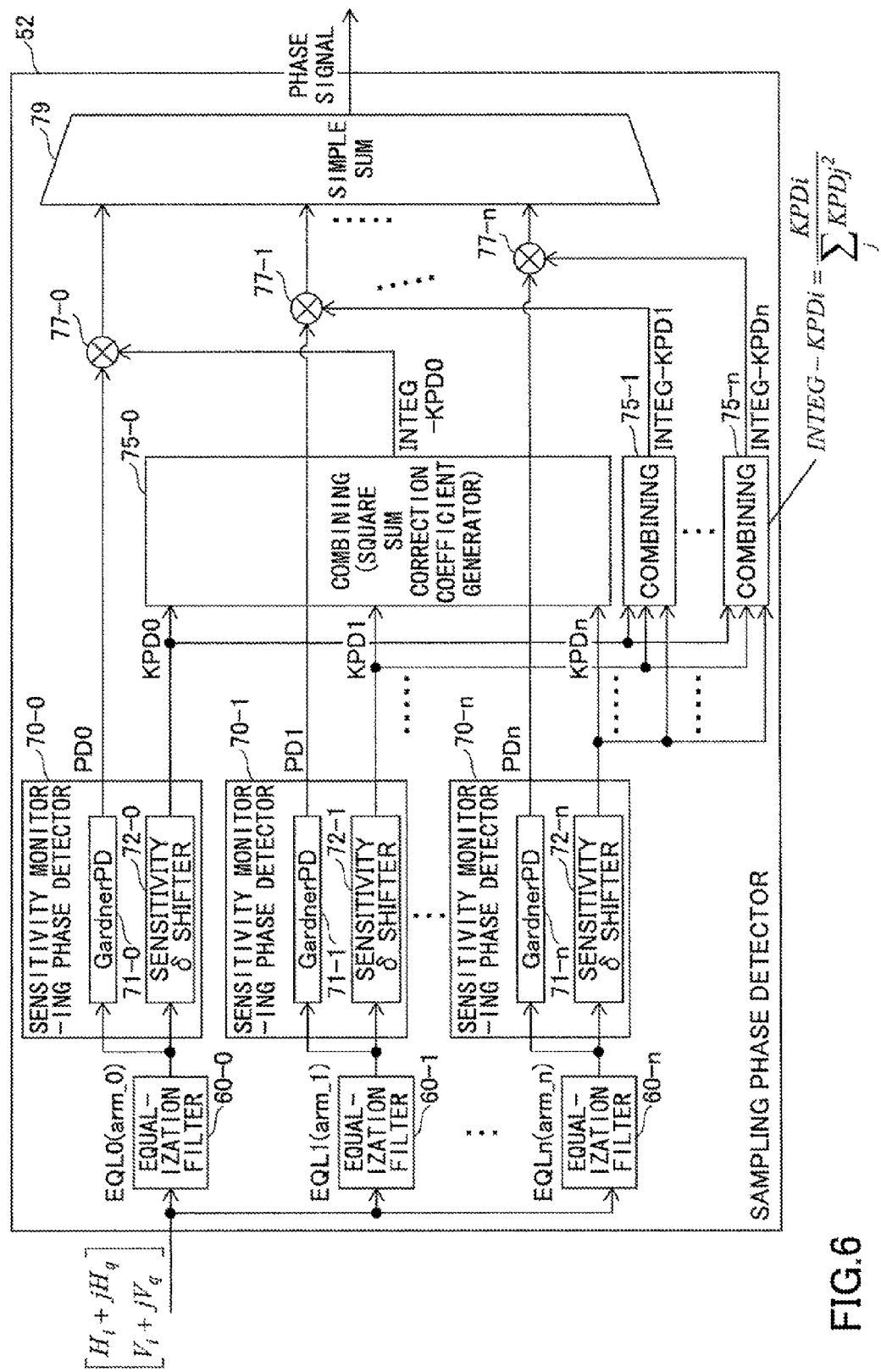
FIG. 6 illustrates an example of a sampling phase detector (PD) used in the sampling phase controller of FIG. 4.

FIG. 6 illustrates an example of the sampling phase detector 52 of the sampling phase controller 42 in FIG. 4. The sampling phase detector 52 includes equalization filters 60-0 through 60-n (referred to collectively as "equalization filters 60"), sensitivity monitoring phase detectors 70-0 through 70-n (referred to collectively as "sensitivity monitoring phase detectors 70"), combiners (square sum correction coefficient generators) 75-0 through 75-n (referred to collectively as "combiners 75"), multipliers 77-0 through 77-n (referred to collectively as "multipliers 77") and an adder 79. Each of the sensitivity monitoring phase detectors 70-0 through 70-n has a phase detector (PD) 71 and a sensitivity delta shifter (a sensitivity monitoring signal generator) 72.

The equalization filters 60-0 through 60-n have different PMD equalization characteristics. For example, equalization conditions, such as an arrival time difference or differential group delay difference (DGD) between the horizontally polarized wave (H-axis polarization) and the vertically polarized wave (V-axis polarization) or a polarization rotation, are selected so as to be different from each other among the equalization filters 60. Because of the different equalization characteristics, a detection result is obtained without fail from any one of the PDs 71 even if the detection sensitivity has lowered at a part of the PDs 71 due to a change in the polarization condition including polarization rotation.

Figure 7:
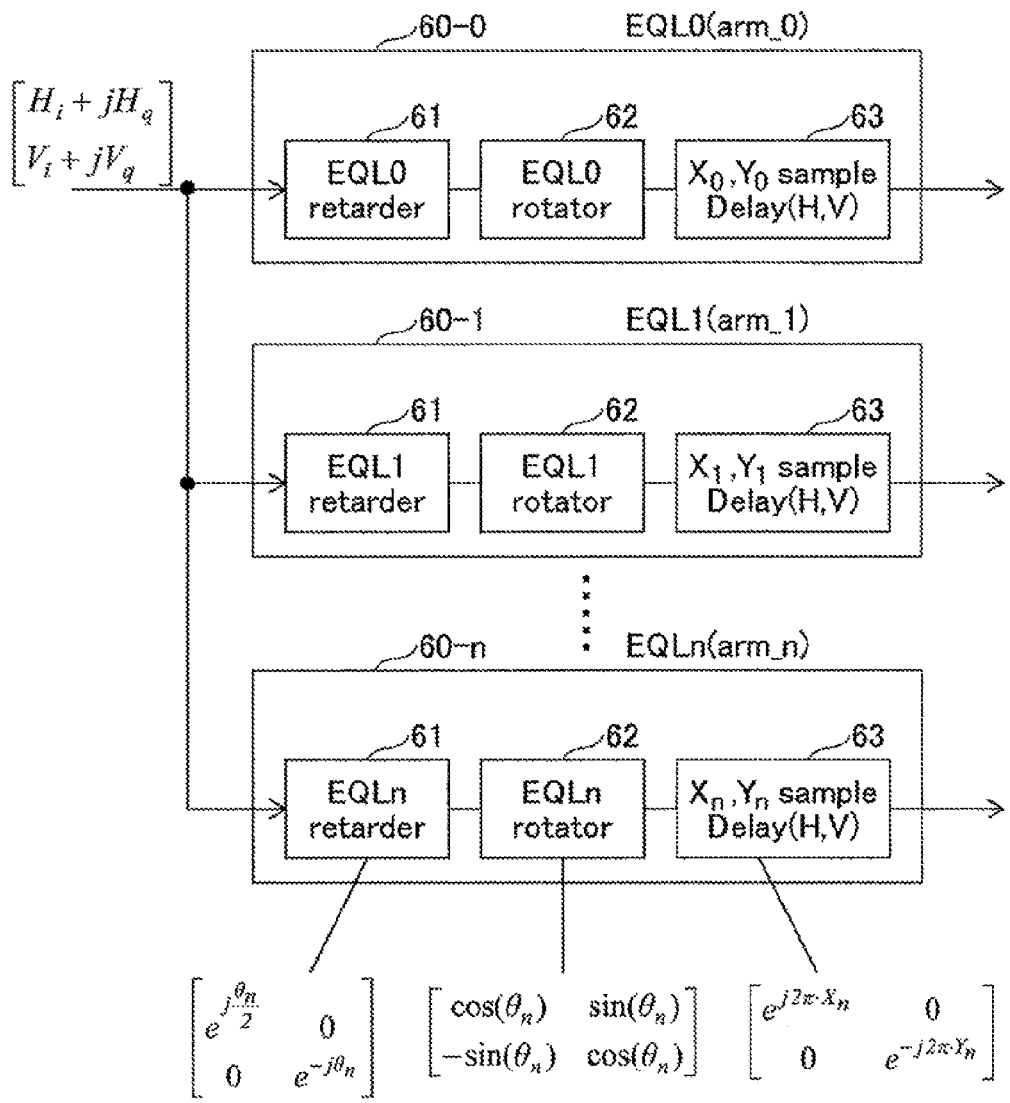
FIG. 7 illustrates an example of an equalization filter used in the sampling phase detector of FIG. 6.

FIG. 7 illustrates an example of the equalization filters 60-0 through 60-n at an arm-0 through an arm-n. An H-axis signal (Hi+jHq) and a V-axis signal (Vi+jVq) are input to each of the equalization filters 60-0 through 60-n. The equalization filters 60 equalize polarization mode dispersions (PMD) with different equalization characteristic values. In this example, the equalization filter 60 includes a retarder 61, a rotator 62 and an H,V sampling delay circuit 63. The retarder 61 changes the phase difference between the polarization axes of the H-axis signal and the V-axis signal. The rotator 62 rotates the polarization axes of the H-axis signal and the V-axis signal. The H,V sampling delay circuit 63 changes the sampling delay difference between the H-axis signal and the V-axis signal. In the figure, Xn represents one sample time of the H-axis signal, and Yn represents one sample time of the V-axis signal.

By setting different values to these parameters in the respective arms, the equalization filters 60-0 through 60-n provide different amounts of phase shift, different amounts of rotation of polarization axis, and different amounts of sample delay difference between the horizontal polarization and vertical polarizations. All of the three types of parameters are not necessarily varied. If at least one parameter is varied among the equalization filters, the equalization characteristics of the equalization filters differ from one another.

Referring back to FIG. 6, the output signal of each equalization filter 60 is separated and input to a phase detector (PD) 71 and a sensitivity delta shifter 72 of a corresponding sensitivity monitoring phase detector 70. The PD 71-0 through 71-n detect phases of the inputted sampling signals which have been subjected to waveform distortion compensation, phase adjustment and equalization, to output phase detection signals PDi (PD0 through PDn). The sensitivity delta shifters 72-0 through 72-n output phase detection results, detected at positions shifted by $\pm\delta$ from the phase of the inputted sampling signals, as sensitivity monitoring signals KPDi (KPD0 through KPDn).

Sensitivity is evaluated from a slope at a linear region in the vicinity of the 0 cross point when the amplitude of the output signal from the PD 71 is plotted as a function of the phase of the input signal to the PD 71. The phase detection result (i.e., a sensitivity monitoring signal) KPDi of the sensitivity delta shifter 72 becomes the maximum when there is no sensitivity degradation, but the amplitude of the output signal with respect to the phase of the input signal, namely the slope at the linear region around the 0 cross point, becomes smaller if the sensitivity is degraded due to polarization rotation, etc.

Figure 8:
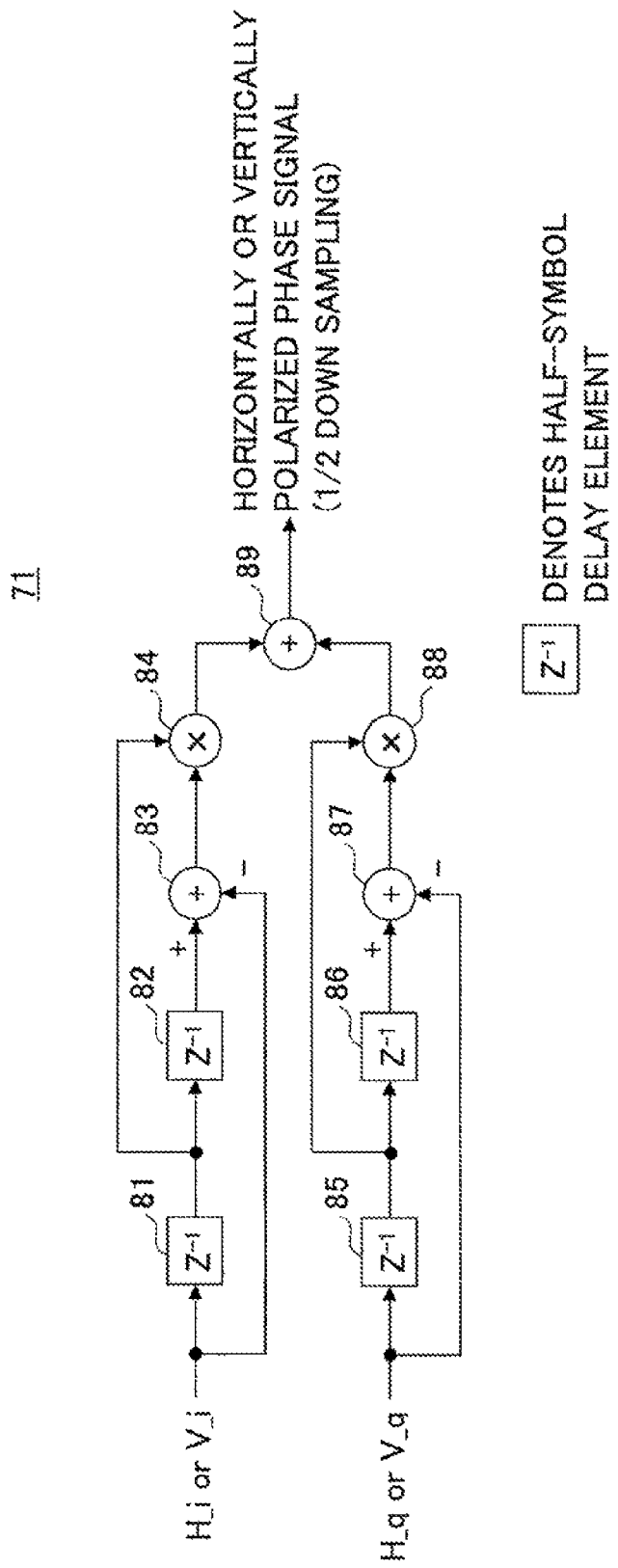
FIG. 8 illustrates an example of a Gardner's phase detector used in a sensitivity monitoring phase detector of FIG. 6.

FIG. 8 illustrates an example of the PD 71 when using a Gardner's phase detector. The Gardner'S phase detector 71 has an I-channel delay element 81, a delay element 82, a subtractor 83, a multiplier 84, a Q-channel delay element 85, a delay element 86, a subtractor 87, a multiplier 88, and an adder 89 for adding outputs of the multipliers 84 and 88.

The I-component of the output signal from the equalization filter 60 is supplied to the delay element 81 and the subtractor 83. The delay element 81 delays the input signal by a half (½) symbol and outputs the delayed signal to the delay element 82 and the multiplier 84. The delay element 82 further delays the output signal from the delay element 81 by a half (½) symbol and outputs the one-symbol delayed signal to the subtractor 83. The subtractor 83 subtracts the I-component signal input to the PD 71, from the output signal of the delay element 82, and outputs the subtraction result to the multiplier 84. The output of the subtractor 83 represents a difference between two signals with one symbol time delay between them. The multiplier 84 multiplies the output of the subtractor 83 by the half (½) symbol delayed signal output from the delay element 81, and supplies the product to the adder 89.

The Q-component of the output signal from the equalization filter 60 is supplied to the delay element 85 and the subtractor 87. The delay element 85 delays the input signal by a half (½) symbol and outputs the delayed signal to the delay element 86 and the multiplier 88. The delay element 86 further delays the output signal from the delay element 86 by a half (½) symbol and outputs the one-symbol delayed signal to the subtractor 87. The subtractor 87 subtracts the Q-component signal input to the PD 71, from the output signal of the delay element 86, and outputs the subtraction result to the multiplier 88. The output of the subtractor 87 represents a difference between two signals with one symbol time delay between them. The multiplier 88 multiplies the output of the subtractor 87 by the half (½) symbol delayed signal output from the delay element 85, and supplies the product to the adder 89.

The adder 89 adds the output of the multiplier 84 and the output of the multiplier 88, and outputs the addition result as a phase detection signal PDn. The operation of the adder 89 is conducted at a rate of ½ down-sampling, that is, at a symbol rate.

Figure 9:
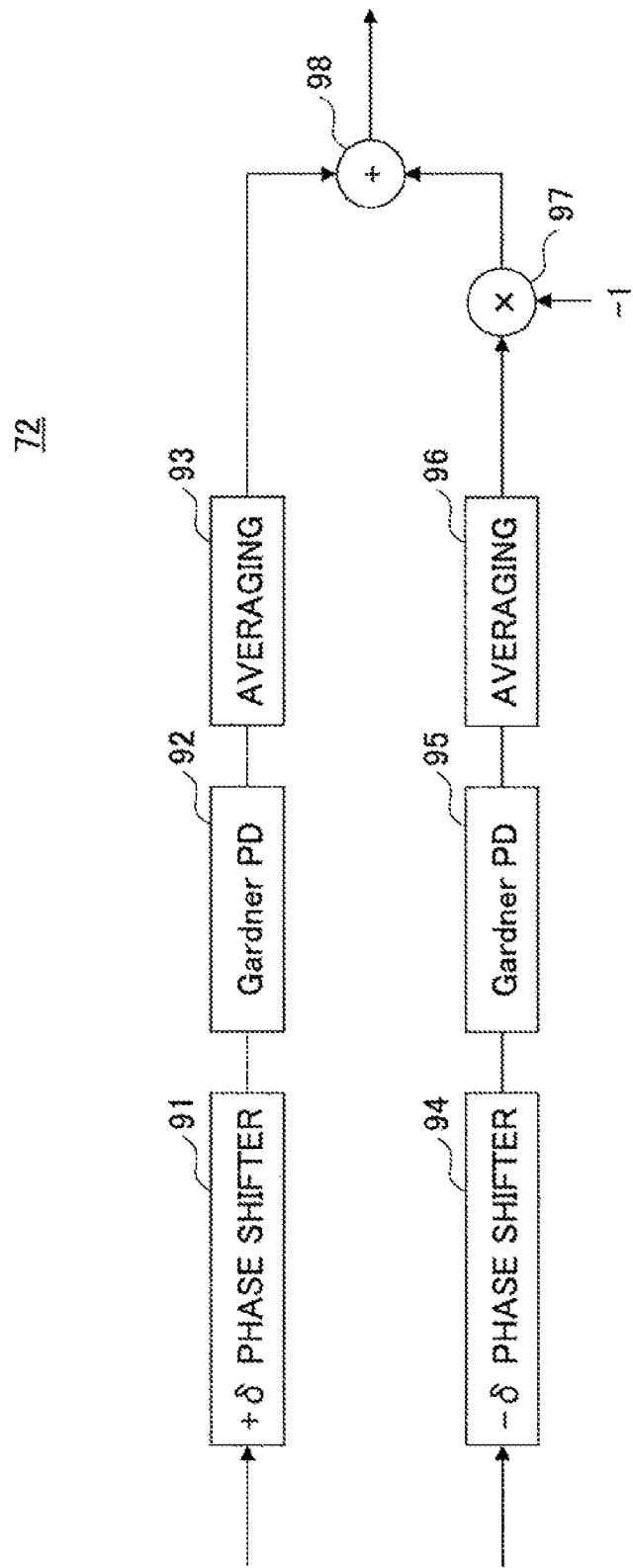
FIG. 9 illustrates an example of a sensitivity delta shifter used in the sensitivity monitoring phase detector of FIG. 6.

FIG. 9 illustrates an example of the sensitivity delta shifter 72. The sensitivity delta shifter 72 monitors the phase detection sensitivity of the PD 71 with respect to bidirectional phase fluctuation by calculating a phase difference between a signal with a phase shifted by $+\delta$ and a signal with a phase shifted by $-\delta$ from the phase of the input sampling signal supplied from the equalization filter 60. The sensitivity delta shifter 72 includes a $+\delta$ phase shifter 91, a phase detector 92, an averaging unit 93, a $-\delta$ phase shifter 94, a phase detector 95, an averaging unit 96, a multiplier 97 and an adder 98.

The $+\delta$ phase shifter 91 shifts the phase of the input sampling signal by $+\delta$ and supplies the phased-shifted signal to the phase detector 92. The phase detector 92 has the same sensitivity degradation characteristic as the PD 71, which is the monitoring target. In this example, the PD 71 and the phase detector 92 are Gardner's phase detectors. If a parallelized signal is input, the output of the phase detector 92 is averaged at the averaging unit 93 and the average is supplied to the adder 98.

The $-\delta$ phase shifter 94 shifts the phase of the input sampling signal by $-\delta$ and supplies the phased-shifted signal to the phase detector 96. The phase detector 95 is the Gardner's phase detector similar to the PD 71. An output of the phase detector 95 is averaged at the averaging unit 96. The average is multiplied by −1 at the multiplier 97 and the multiplication result is supplied to the adder 98. The adder 98 subtracts the output of the averaging unit 86 (which is the negative phase detection signal) from the output of the averaging unit 93 (which is the positive phase detection signal), and outputs the difference as a sensitivity monitoring signal KPDi. As has been explained above, the region of $\pm\delta$ is a region where the PD 71 is able to detect the input signal linearly. With this arrangement, the phase detection sensitivity of the corresponding PD 71 can be monitored accurately.

Although in the embodiments the phase of the filter output signal is shifted to both the positive and negative sides for the phase detection, the phase detection may be carried out by shifting the phase of the filter output to only one direction. For example, when shifting the phase to the positive direction, a process sequence of the negative side, the multiplier 97 and the adder 98 are removed, and the output of the phase detector 92 (or the averaging unit 93) is supplied as the sensitivity monitoring signal to all of the combiners 75-0 through 75-n.

Returning again to FIG. 6, the phase detection signal from the sensitivity delta shifter 72 of the sensitivity monitoring phase detector 70-0, which is the sensitivity monitoring signal KPD0, is supplied to all the combiners 75-0 through 75-n. Output KPD1 from the sensitivity delta shifter 72 of the sensitivity monitoring phase detector 70-1 is also supplied to all the combiners 75-0 through 75-n. In the same manner, each of the sensitivity monitoring signals KPD2 through KPDn, which are the outputs of the sensitivity monitoring phase detectors 70-2 through 70-n, are supplied to all the combiners 75-0 through 75-n.

Consequently, each of the combiners 75-0 through 75-n acquires sensitivity monitoring signals from all the sensitivity monitoring phase detectors 70-0 through 70-n. Each combiner 75 calculates a square sum $\Sigma KPDj^2$ of the acquired sensitivity monitoring signals KPD0-KPDn, and generates a sensitivity correction coefficient using the square sums. More particularly, the sensitivity correction coefficient is generated based upon a ratio of the sensitivity monitoring result of the target signal to the square sum. In the example of FIG. 6, a KPD output (KPDi) is multiplied by an inverse of the square sum of the sensitivity monitoring signal KPDj to generate the sensitivity correction coefficient for the phase detector (PD) 71. In this case, the sensitivity correction coefficient INTEG-KPDi generated at the combiner 75-i is expressed by Equation (1).

$$INTIG - KPDi = \frac{KPDi}{\sum_j KPDj^2} \quad (1)$$

The sensitivity correction coefficient INTEG-KPD0 generated at the combiner 75-0 is input to a multiplier 77-0 and multiplied by a phase detection signal PD0 output from the corresponding PD 71-0. The multiplication result is supplied to the adder 79.

The sensitivity correction coefficient INTEG-KPD1 generated at the combiner 75-1 is input to a multiplier 77-1 and multiplied by a phase detection signal PD1 output from the corresponding PD 71-1 of the sensitivity monitoring phase detector 70-1. The multiplication result is supplied to the adder 79.

Similarly, the sensitivity correction coefficient INTEG-KPDn generated at the combiner 75-n is input to a multiplier 77-n and multiplied by a phase detection signal PDn output from the corresponding PD 71-n of the sensitivity monitoring phase detector 70-n. The multiplication result is supplied to the adder 79.

The adder 79 calculates a simple sum of all the multiplication results and outputs the summation as a phase signal. This phase signal is fed back to the sampling phase adjustor 51 and the frequency variable oscillator 35, as illustrated in FIG. 4.

Figure 10:
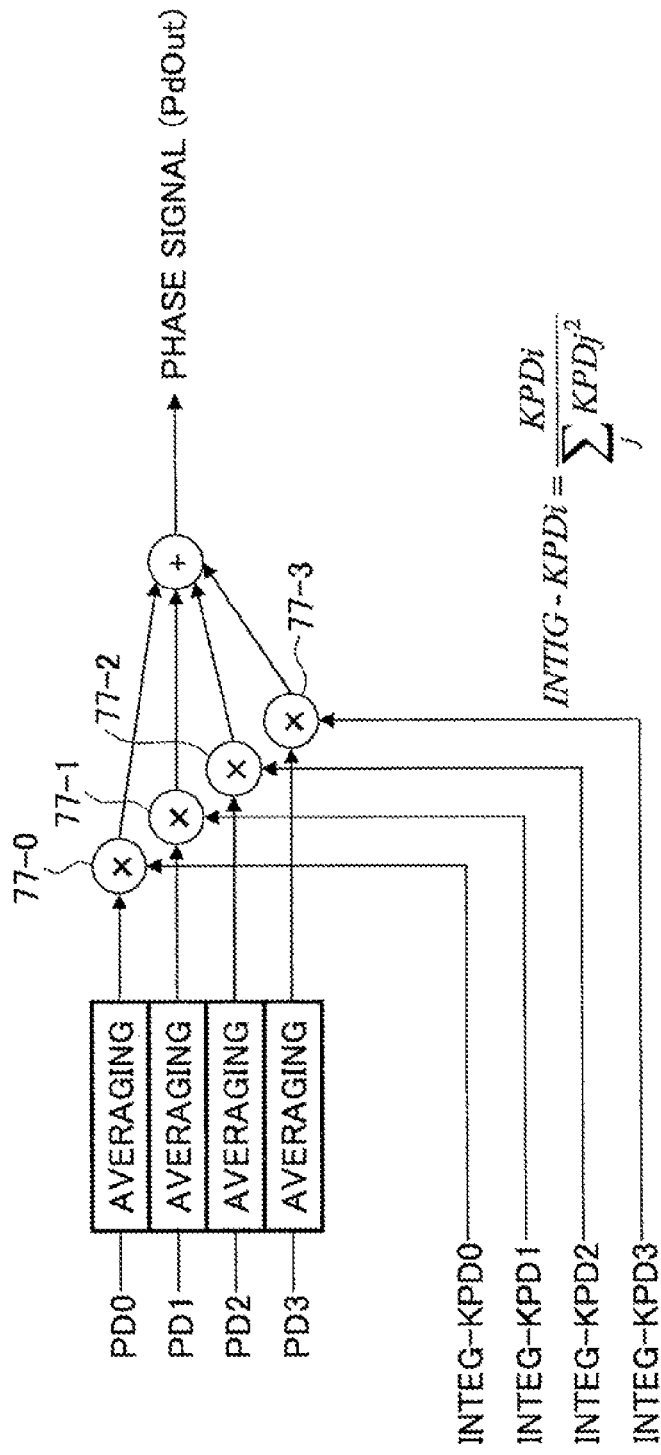
FIG. 10 illustrates a sensitivity-corrected phase signal generated by and output from the sampling phase detector of FIG. 6.

FIG. 10 is a schematic diagram illustrating the operations of the sensitivity monitoring phase detector 70-0 through 70-n, the combiner (the squares sum correction coefficient generator) 75-0 through 75-n, the multiplier 77-0 through 77-n and the adder 79 in FIG. 6. In this example, the square sum of the sensitivity monitoring signals from four arms (i=0, 1, 2 and 3) is used to generate a sensitivity correction coefficient INTEG-KPDi for correcting the phase detection sensitivity of the corresponding PD 71i.

The phase detection signals PD0 through PD3 output from the sensitivity monitoring phase detectors 70-0 through 70-3 are individually averaged and input to corresponding multipliers 77-0 through 77-3. Using the square sum of the sensitivity monitoring signals KPD0 through KPD3, sensitivity correction coefficients INTEG-KPD0 through INTEG-KPD3 are generated by the combiners 75-0 through 75-3 and input to the corresponding multipliers 77-0 through 77-3.

During this operation, phase detection signal PDi output from each PD 71 is corrected by the sensitivity correction coefficients INTEG-KPDi.

The adder 79 adds all the sensitivity-corrected phase detection signals to calculate a total sum. The output PdOut of the adder 79 becomes a phase signal output from the sampling phase detector 52 in FIG. 4 and FIG. 6. An outputted phase signal PdOut is expressed by Equation (2).

$$PdOut = \sum_i PDi \cdot [INTIG - KPDi] = \frac{\sum_i PDi \cdot KPDi}{\sum_j KPDj^2} \quad (2)$$

By using the square sum of all the sensitivity monitoring values to generate a correction coefficient for each PD output at the maximum proportion to the focused-on sensitive monitoring signal KPDi and by combining the corrected PD outputs, the conventional issues can be resolved. Namely, undesirable fluctuation in correction value or a gap generated when changing the correction value can be prevented and a stable phase detection signal can be output.

Figure 11:
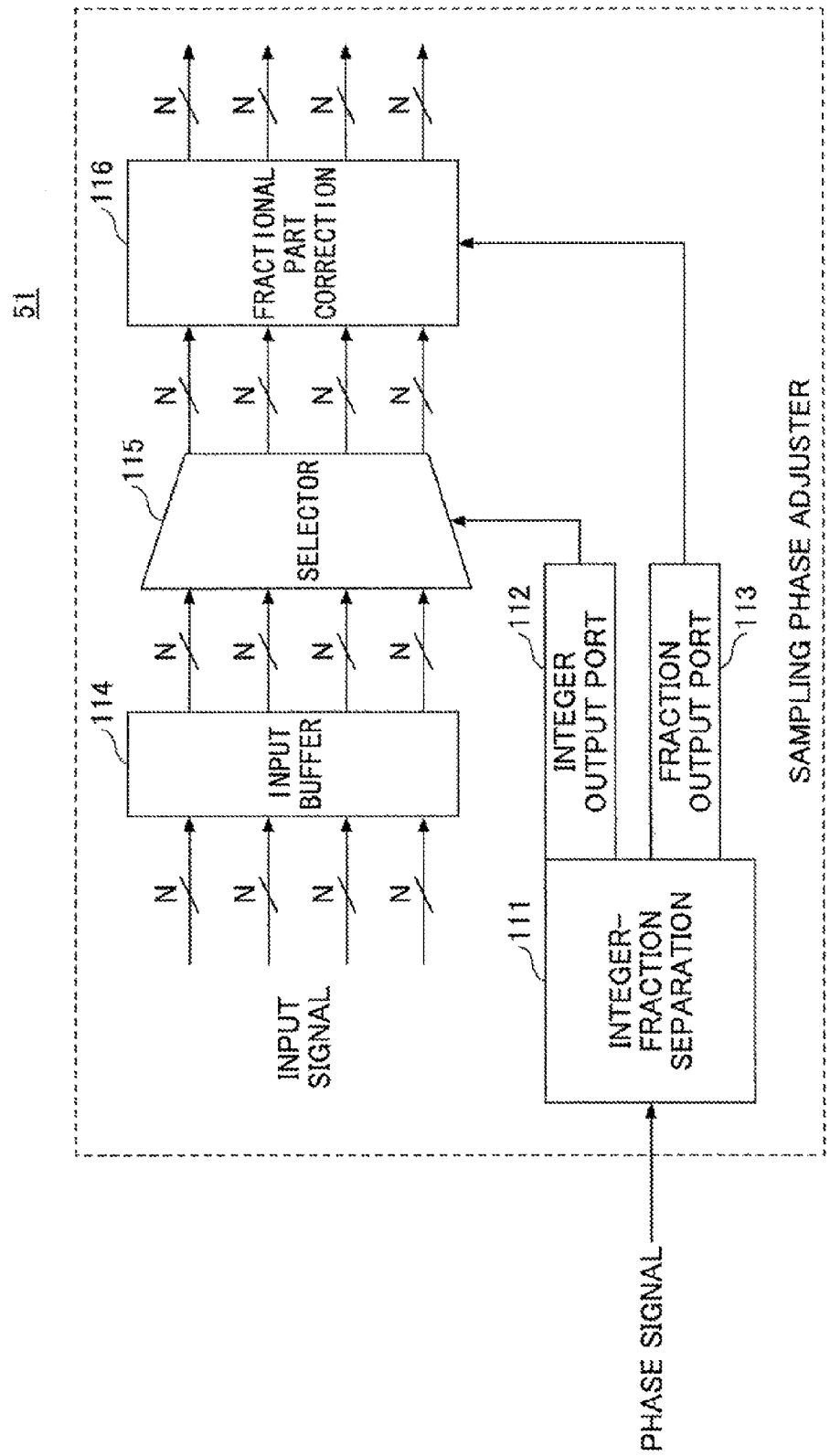
FIG. 11 illustrates an example of a sampling phase adjustor controlled by the phase signal of FIG. 10.

FIG. 11 illustrates an example of the sampling phase adjustor 51 (see FIG. 4) which receives the phase signal (PdOut) via the loop filter 53. The sampling phase adjustor 51 includes an integer-fraction separator 111, an integer output port 112, a fraction output port 113, an input buffer 114, a selector 115 and a fractional part correction circuit 116. The inputted phase signal is separated into an integer value and a fraction value by the integer-fraction separator 111 on the sample-by-sample basis. In other words, the phase signal is divided by a sampling period and separated into an integer part and a fractional part. The integer value is supplied from the integer part output port 112 to the selector 115, and the fractional value is supplied from the fractional part output port 113 to the fractional part correction circuit 116.

Four-channel sampling signals are input to the sampling phase adjustor 51. At each channel, the digital data are parallelized into N lines and the waveform distortion is compensated for. The N parallel digital data items are supplied via an input buffer 114 to a selector 115. The selector 115 carries out barrel shift on the N parallel digital data items by the integer value (which denotes the sampling number) calculated from the phase signal. The fractional part correction circuit 116 adjusts a phase less than 1 sample time in the time domain or the frequency domain.

Figure 12:
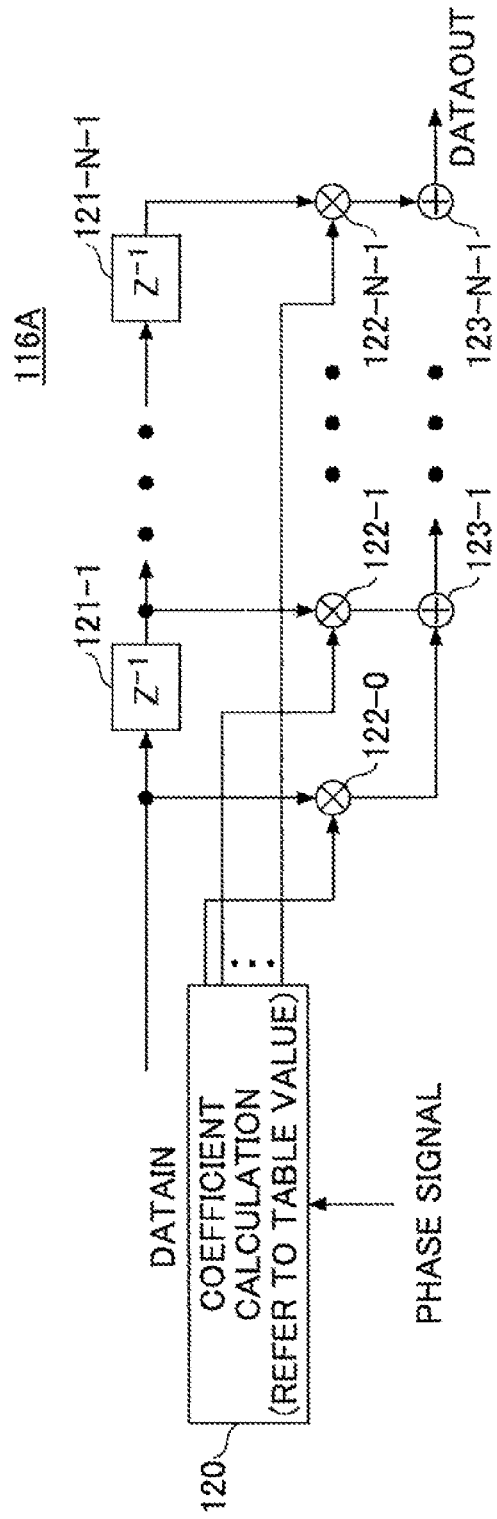
FIG. 12 illustrates an example of a fractional part correction circuit of the sampling phase adjustment of FIG. 11.

FIG. 12 illustrates an example of the fractional part correction circuit 116A that performs phase adjustment in the time domain. The fractional part correction circuit 116A is structured as a finite impulse response filter, and it has a coefficient calculator 120, delay elements (tap elements) 121-1 through 121-(N−1), multipliers 122-0 through 122-(N−1) and adders 123-1 through 123-(N−1). The coefficient calculator 120 determines coefficients to be supplied to the multipliers 122-0 through 122-(N−1) by, for example, referring to a table (not illustrated in figures) based upon the fractional value of the input phase signal. The input data (DATAIN) and the outputs of the respective delay elements 121-1 through 121-(N−1) are multiplied by the corresponding coefficients at the associated multipliers 122-0 through 122-(N−1). The multiplication results are sequentially added by the adders 123-1 through 123-(N−1). The output of the last adder 123-(N−1) becomes the output signal of the sampling phase adjustor 51.

Figure 13:
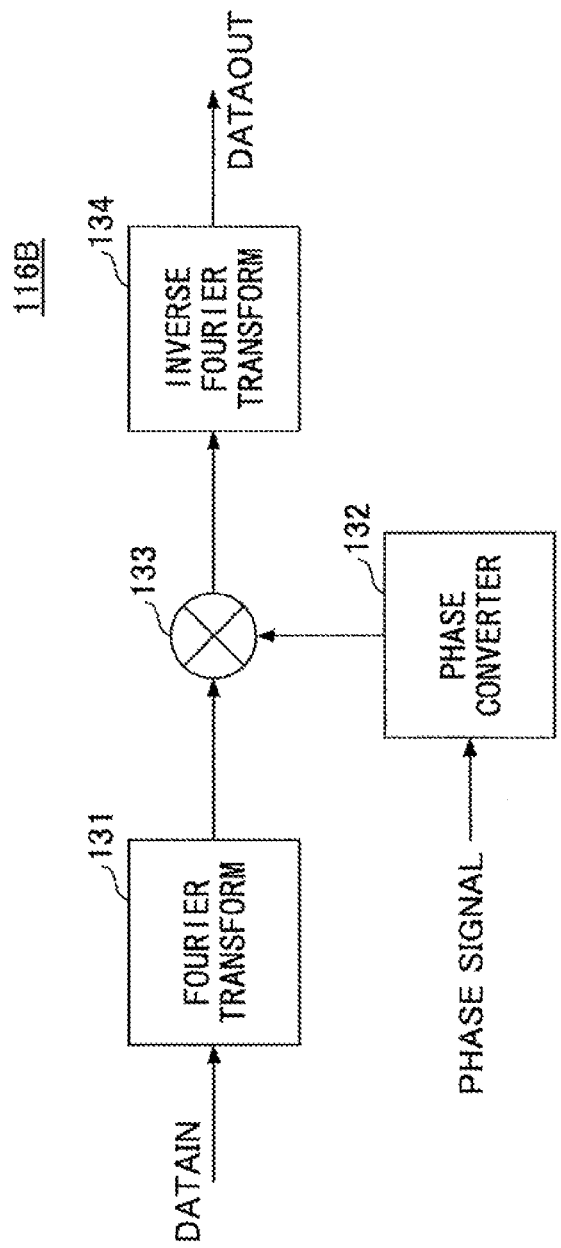
FIG. 13 illustrates another example of the fractional part correction circuit of the sampling phase adjustor of FIG. 11.

FIG. 13 illustrates another example of a fractional part correction circuit 116B that performs phase adjustment in the frequency domain. The fractional part correction circuit 116B includes a Fourier transform circuit 131, a phase converter 132, a multiplier 133 and an inverse Fourier transform circuit 134. An inputted data signal is subjected to fast Fourier transform (FFT) at the Fourier transform circuit 131, converted into a frequency-domain signal, and supplied to the multiplier 133. On the other hand, the phase converter 132 generates a phase shift coefficient corresponding to the phase of the fractional part of the phase signal based upon the fractional value of the phase signal, and supplies the phase shift coefficient to the multiplier 133. The multiplier 133 multiplies the frequency-domain signal output from Fourier transform circuit 131 by the phase shift coefficient supplied from the phase converter 132, and outputs the multiplication result to the inverse Fourier transform circuit 134. The inverse Fourier transform circuit 134 performs inverse fast Fourier transform (IFFT) on the output of the multiplier 133 and outputs the transform result. The inverse Fourier transformed signal becomes the output signal of the sampling phase adjustor 51.

In this manner, the sampling phase adjustor 51 adjusts the phase of the inputted sampling data based upon the phase signal fed back from the sampling phase detector 52.

Figure 14:
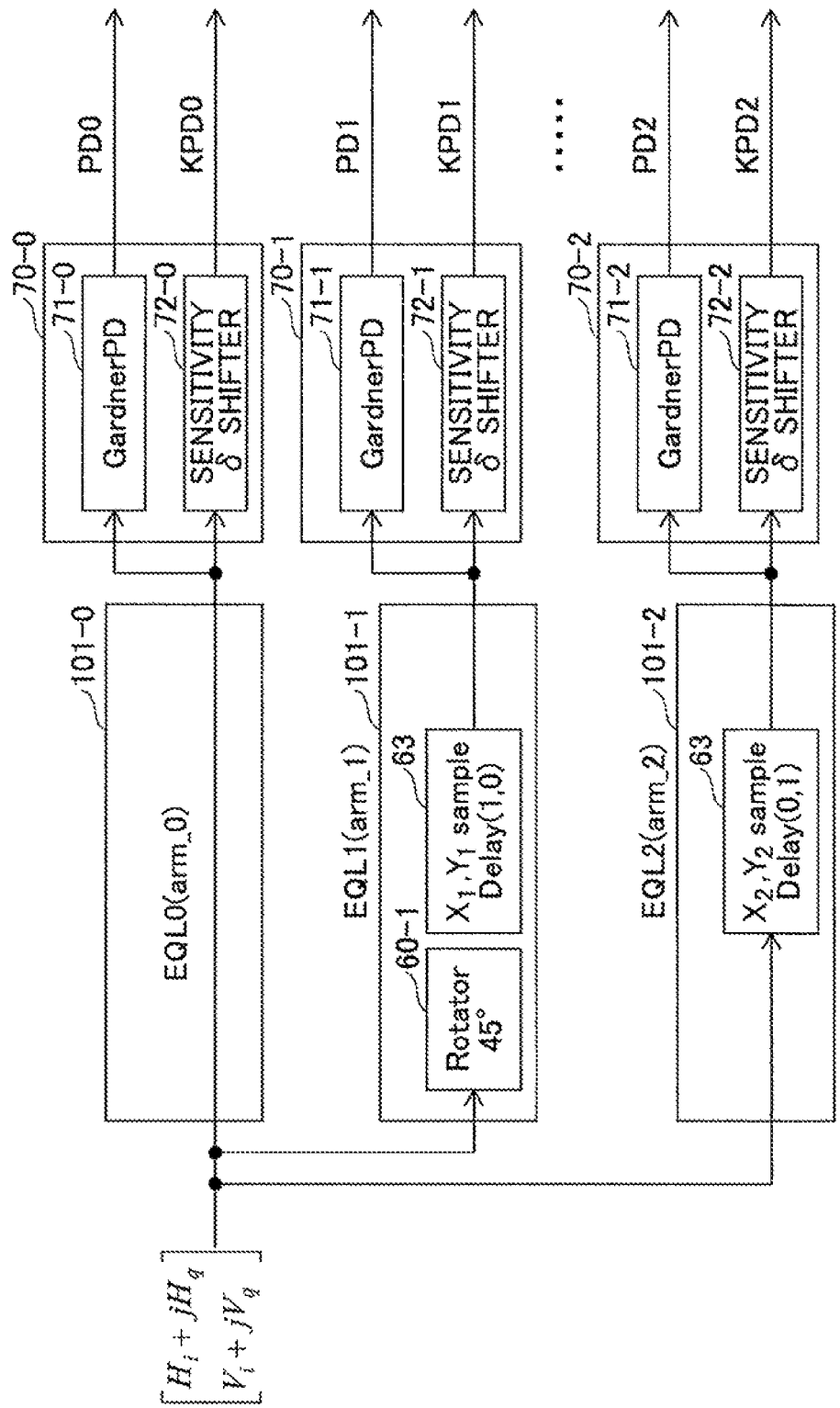
FIG. 14 is a diagram illustrating an advantage of the pre-PD filter arranged before the sensitivity monitoring phase detector.
Figure 15A:
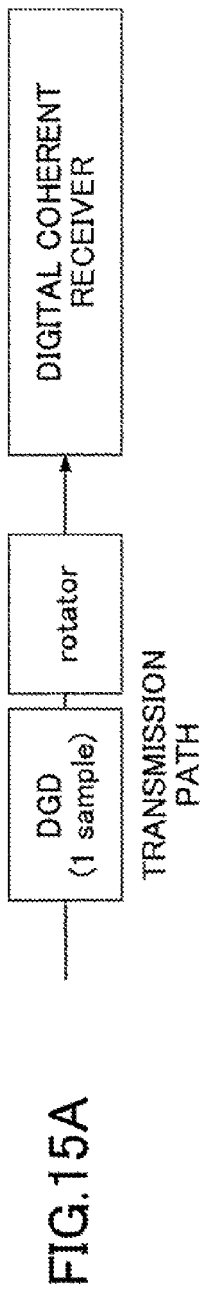
FIG. 15A illustrates an optical transmission path model.
Figure 15B:
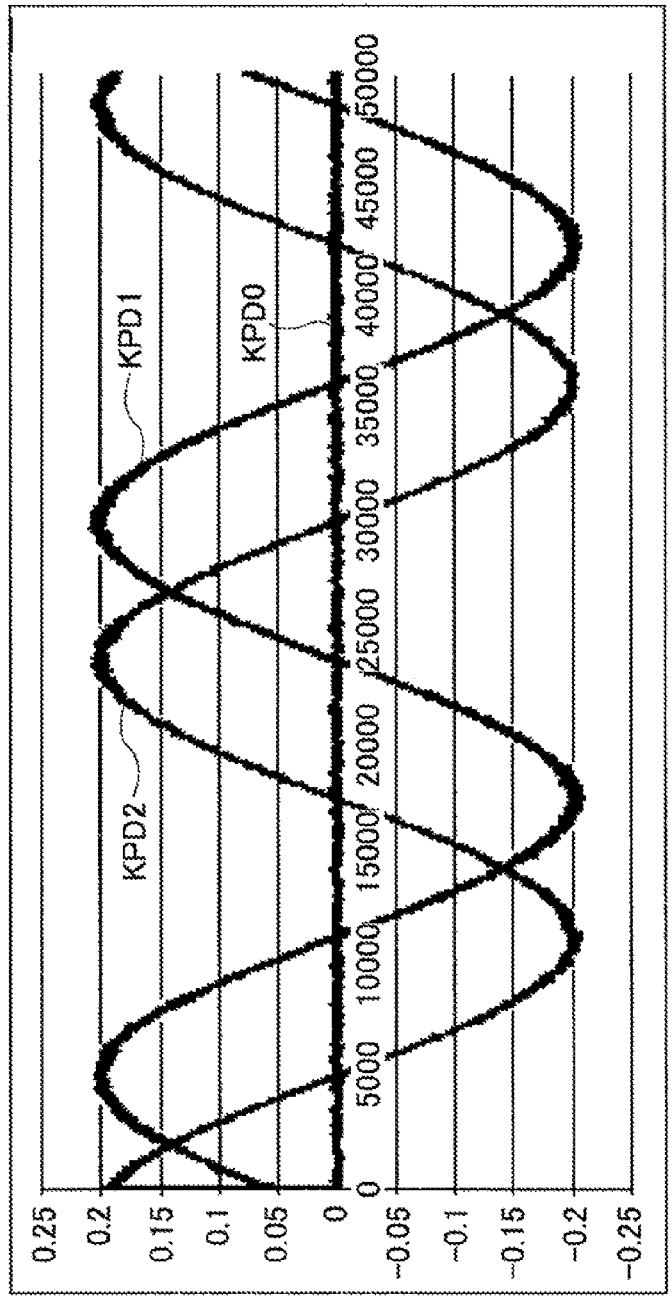
FIG. 15B is a diagram illustrating an advantage of the pre-PD filter arranged before the sensitivity monitoring phase detector.

FIG. 14, FIG. 15A and FIG. 15B illustrate advantages of using plural filters in the sampling phase controller 52. It is assumed in the example of FIG. 14 that three arms (arm_0, arm_1, and arm_2) are used to produce phase detection signals PD0, PD1 and PD2, and sensitivity monitoring signals KPD0, KPD1 and KPD2.

No equalization parameter is supplied to a filter 101-0 of the arm_0, and the phase detection signal PD0 is output from the phase detector 71-0 of a subsequent stage, while the sensitivity monitoring signal KPD0 is output from the sensitivity delta shifter 72-0.

In a filter 101-1 of the arm_1, 45-degree rotation is applied to the polarization axis and 1 sample delay difference is provided to the H-axis signal (X1). Based upon the filter output defined by these conditions, the phase detection signal PD1 is output from the PD 71-1, and the sensitivity monitoring signal KPD1 is output from the sensitivity delta shifter 72-1.

In a filter 101-2 of the arm_2, 1 sample delay difference is provided to a V-axis signal (Y2). Based upon the filter output defined by this condition, the phase detection signal PD2 is output from the PD 71-2, and the sensitivity monitoring signal KPD2 is output from the sensitivity delta shifter 72-2.

An optical transmission path model illustrated in FIG. 15A is provided, through which a signal is received at a digital coherent receiver. In this optical transmission path model, one sample differential group delay (DGD) and a rotation of polarization axis are set. DGD indicates differential arrival time at the digital coherent receiver between the horizontally polarized wave (H-axis polarization) and the vertically polarized wave (V-axis polarization). DGD is a scale indicating a degree of the polarization mode dispersion.

FIG. 15B is a graph plotting the sensitivity monitoring signals KPD0, KPD1, and KPD2 indicating phase detection sensitivity for the signal received at the digital coherent receiver from the optical transmission path of FIG. 15A. From the graph, it is understood that even if the phase detection sensitivity of KPD0 is almost zero, the zero sensitivity of KPD0 can be compensated for by KPD1 and KPD2. This arrangement can avoid an undesirable situation where the phase detection result is interrupted.

Figure 1A:
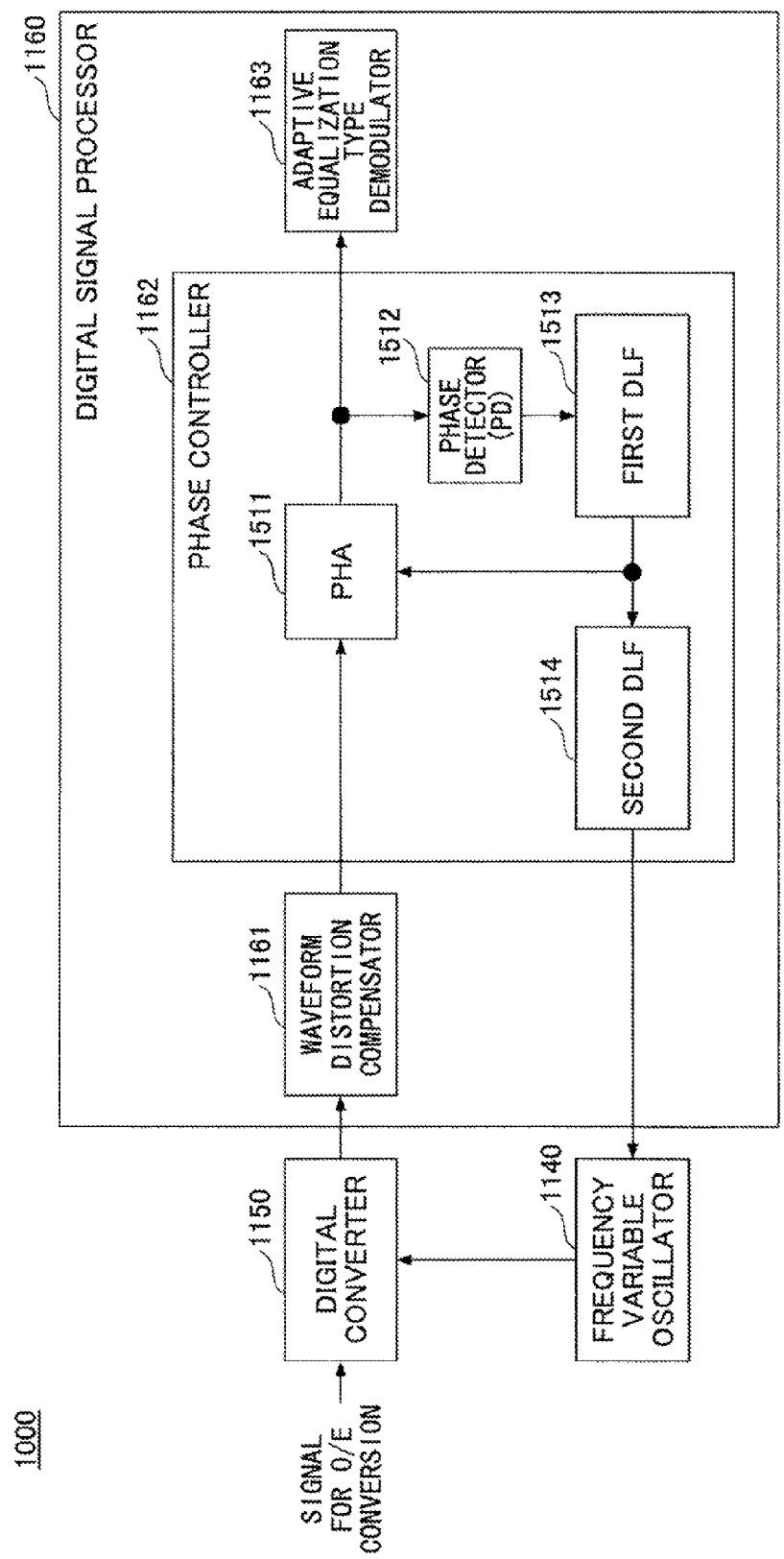
FIG. 1A is a schematic diagram of a conventional digital coherent receiver.
Figure 16A:
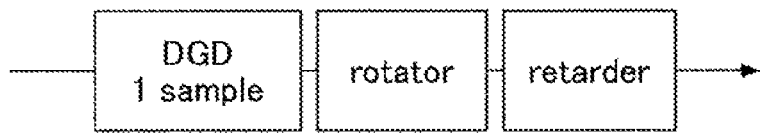
FIG. 16A illustrates a PMD model in the optical transmission path.

FIG. 16A through FIG. 16C, FIG. 17A and FIG. 17B illustrate advantages of the sensitivity correction using a square-sum combining method according to the embodiment. FIG. 16A illustrates a PMD model in the optical transmission path, in which a single-stage PMD is inserted. In this transmission path model, 1 sample differential group delay (DGD), a rotation of polarization axis, and a phase difference of polarization axis are set. A suitable filter is selected as an equalization filter 60 (see FIG. 6) arranged before the phase detector (PD) 71. Then a combined output (a phase signal) having been subjected to sensitivity correction using a square sum of all the KPD outputs with ⅛ sample offset, is calculated. For a purpose of comparison, a combined output (a phase signal) which has been sensitivity-corrected using a simple sum of the KPD outputs is calculated under the same condition. In addition, a combined output (a phase signal) which has been sensitivity-corrected using a diversity sum of only over-threshold phase detection values (as illustrated in FIG. 1B) is calculated.

Figure 16C:
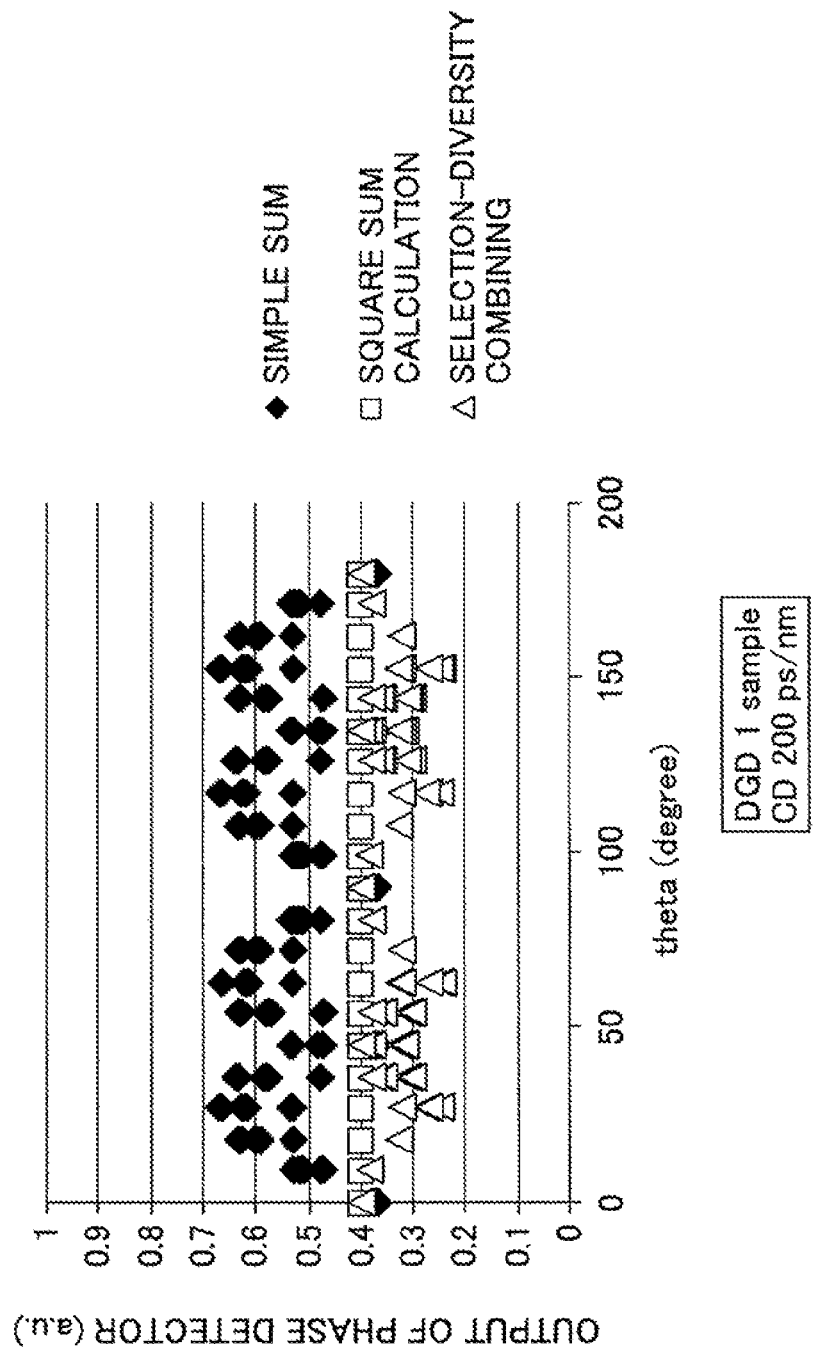
FIG. 16C illustrates an advantage of the square-sum combining method according to the embodiment.

FIG. 16B is a graph plotting phase detector outputs under the conditions that the DGD is 1 sample and that there is no wavelength dispersion (or chromatic dispersion). FIG. 16C is graph plotting phase detector outputs under the conditions that the DGD is 1 sample and that wavelength dispersion (CD) is 200 ps/nm. The horizontal axis of the graph is rotation angle (θ) of polarization axis, and the vertical axis is intensity of the phase signal. The sensitivity corrected phase signals using a square sum method are plotted by square marks; sensitivity corrected phase signals using a simple sum method are plotted by diamond marks; and sensitivity corrected phase signals using a selection-diversity combining method are plotted by triangle marks.

As is clearly understood from FIG. 16B, the square sum method of the embodiment can provide stable phase detection outputs even if rotation of the polarization axis occurs in a situation where there is no wavelength dispersion. In contrast, with a simple sum method, the phase detection results vary depending on the rotational state of the polarization axis. The phase signal susceptible to polarization fluctuation cannot be used as a control signal because phase adjustment of an input sampling signal or clock frequency may not be controlled correctly. With a selection-diversity combining method using only over-threshold phase detection results, the phase detection output signals fall drastically (with sensitivity degraded) depending on a rotational condition of polarization.

FIG. 16C illustrates the advantage of the embodiment more clearly. When the polarization axis has suddenly rotated in a condition where wavelength dispersion exists, the phase detection outputs acquired by the simple sum method vary widely. With the selection-diversity combining method using only over-threshold values, lowering of the phase detection output level becomes conspicuous compared to FIG. 16B. In contrast, using the square sum method of the embodiment, despite of the wavelength dispersion and the polarization axis rotation, stable phase detection outputs can be acquired.

Figure 17A:
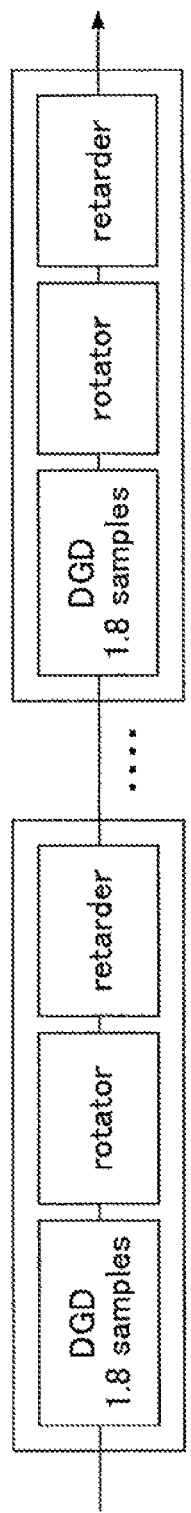
FIG. 17A illustrates a PMD model in the optical transmission path.

FIG. 17A illustrates a PMD model of the optical transmission path in which multiple stages of PMD are inserted. In this path model, fifteen PMDs are inserted in series where each PMD includes DGD of 1.8 samples, polarization axis rotation and a phase difference. Similar to FIG. 16A, a suitable filter is selected, and a combined output (a phase signal) which has been sensitivity corrected using a square sum of all the KPD outputs with ⅛ sample offset is calculated. For the purpose of comparison, a combined output (a phase signal) having been sensitivity corrected using a simple sum method and a combined output (a phase signal) having been sensitivity corrected using a selection-diversity combining method (illustrated in FIG. 1B) are calculated.

Figure 17B:
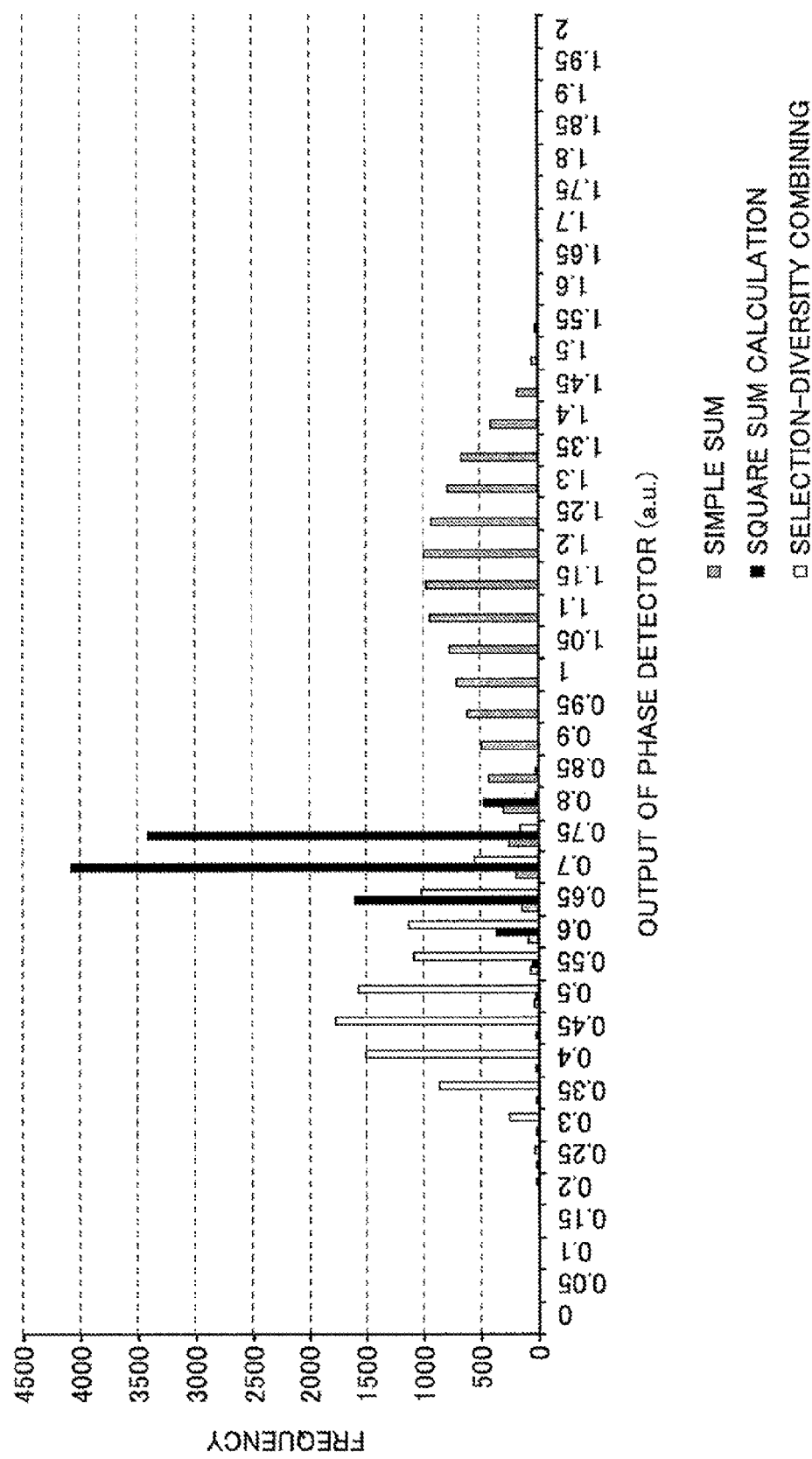
FIG. 17B illustrates an advantage of the square-sum combining method according to the embodiment.

FIG. 17B is a graph illustrating the comparison result among the above-described three methods. The horizontal axis of the graph represents phase detection output level, and the vertical axis represents frequency. With the square sum method of the embodiment, phase detection output levels are concentrated near a specific intensity level. This indicates that the phase detection outputs are stable. In contrast, with a simple sum method, the phase detection output levels vary widely. This indicates that using a simple sum for sensitivity correction is inappropriate. There is also variation in phase detection output level acquired by a selection-diversity combining method.

From the foregoing description, when a phase signal is produced using square-sum sensitivity correction according to the embodiment, correction fluctuation is small even if polarization fluctuation has occurred, and stable phase control can be carried out.

Figure 18:
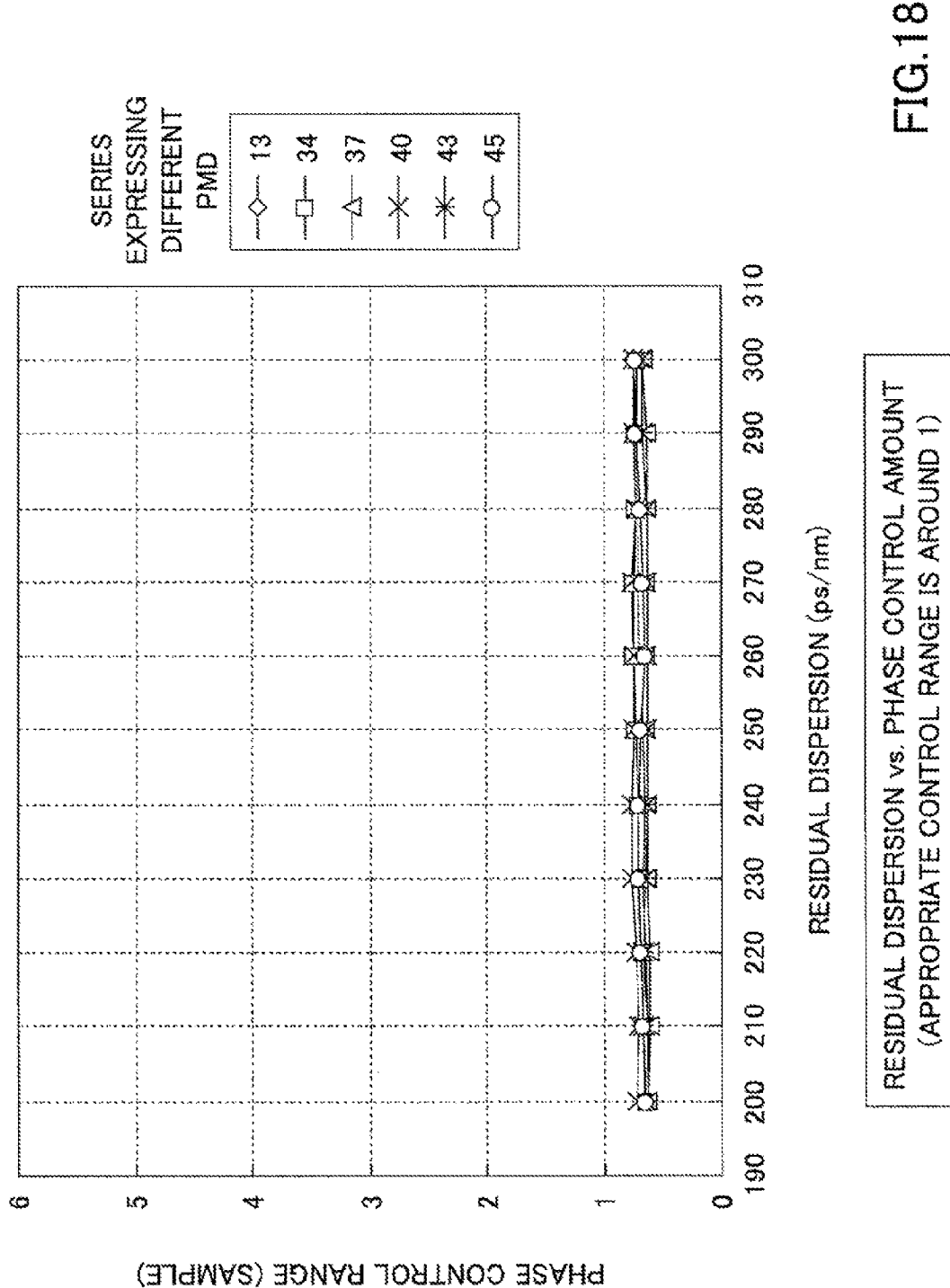
FIG. 18 is a diagram illustrating an advantage of the embodiment.

FIG. 18 is a graph exhibiting advantage of the phase control method of the embodiment, which graph corresponds to that in FIG. 2. Simulation is conducted under the same conditions as FIG. 2 to study the relationship between phase control amount [sample] and residual dispersion. Despite fluctuation in residual dispersion, the phase control amount is located stably in a vicinity of 1 sample. Besides, despite of the fluctuation in residual dispersion, a stable Q value is realized.

By generating a sensitivity correction coefficient using a square sum of all the sensitivity monitoring signals, an undesirable control gap can be avoided when switching the correction value even if polarization mode dispersion or sudden fluctuation in polarization has occurred. Consequently, stable phase signals can be output.

FIG. 19 illustrates other combining methods. In part (A) of FIG. 19, an inverse of the square sum of the KPD outputs (sensitivity monitoring signals) is multiplied to generate a sensitivity correction coefficient, as in the above-described embodiment. In this modification, each KPD output is divided by the absolute value of this KPD output itself to calculate KPDi/|KPDi|, which division result is then multiplied by the inverse of the square sum to produce the sensitivity correction coefficient. This sensitivity correction coefficient specifies only a direction of correction, while reflecting the entirety of the sensitivity monitoring results using the square sum of all the KPD outputs. This sensitivity correction coefficient is also advantageous because stable phase signals can be output while preventing a gap due to polarization fluctuation.

In part (B) of FIG. 19, the sensitivity correction coefficient INTEG-KPDi takes the maximum ratio of the square value of a sensitivity monitoring signal (KPD) to the square sum of all the KPD outputs. In addition, a direction of correction is specified by KPDi/|KPDi|. By combining all the PD outputs having been corrected by this type of sensitivity correction value, variation in the output phase signal is further reduced and the noise reduction effect is increased.

The above-described control operations of the sampling phase detector 52 may be implemented as software control using a general purpose processor.

Or alternatively, the entirety of the digital signal processor 40 may be implemented by software control using a general purpose processor. In these cases, a program is installed in the digital coherent receiver to cause the processor to execute waveform distortion compensation, sampling phase adjustment, sampling phase detection, generation of the phase signal (including generation of sensitivity correction coefficients, sensitivity correction of phase detection signals, and combining of the sensitivity corrected phase detection signals), and any other processes.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. A digital coherent receiver comprising:
    a digital converter to sample a signal received from an optical transmission path and generate a digital signal;
    a sampling phase detector to detect a phase of the sampled digital signal;
    a phase adjustor to adjust a sampling phase of the digital signal based upon the detected phase; and
    a demodulator to demodulate the phase-adjusted digital signal,
    wherein the phase detector includes
    two or more filters to equalize the digital signal with different equalization characteristics;
    two or more sensitivity monitoring phase detectors, each connected to one of the filters and configured to output a phase detection signal representing a phase of an output signal from the associated filter and a sensitivity monitoring signal representing a sensitivity of the phase detection,
    two or more sensitivity correction coefficient generators, each generating a sensitivity correction coefficient for correcting the associated phase detection signal using a square sum of the sensitivity monitoring signals, and
    an adder to add the phase detection signals that have been corrected by the sensitivity correction coefficients and output a phase signal.

2. The digital coherent receiver according to claim 1, wherein each of the sensitivity correction coefficient generators calculates the square sum of all the sensitivity monitoring signals output from the sensitivity monitoring phase detectors and generates the sensitivity correction coefficient by multiplying an inverse of the square sum by the associated sensitivity monitoring signal.

3. The digital coherent receiver according to claim 2, wherein each of the sensitivity correction coefficient generators generates the sensitivity correction coefficient by multiplying the inverse of the square sum by a division result dividing the associated sensitivity monitoring signal by an absolute value of the sensitivity monitoring signal.

4. The digital coherent receiver according to claim 2, wherein each of the sensitivity correction coefficient generators generates the sensitivity correction coefficient by multiplying the inverse of the square sum by a product of a square of the associated sensitivity monitoring signal and a sign of the sensitivity monitoring signal.

5. The digital coherent receiver according to claim 1, wherein each of the sensitivity monitoring phase detectors includes
    a first phase detector to detect the phase of the output signal from the associated filter and output the phase detection signal, and
    a phase shifter to shift the phase of the output signal from the associated filter by a predetermined amount to a first direction, and
    a second phase detector to detect a phase of the first-direction phase-shifted detected signal, wherein the output of the second phase detector is supplied as the sensitivity monitoring signal to all the sensitivity correction coefficient generators.

6. The digital coherent receiver according to claim 5, wherein each of the sensitivity monitoring phase detectors further includes
a second phase shifter to shift the phase of the output signal from the associated filter by a predetermined amount to a second direction opposite to the first direction, and
a third phase detector to detect a phase of the second-direction phase-shifted signal,
wherein a difference between the phase of the first-direction phase-shifted signal and the phase of the second-direction phase-shifted signal is supplied as the sensitivity monitoring signal to all the sensitivity correction coefficient generators.

7. The digital coherent receiver according to claim 1, wherein the sampling phase detector is connected to an output of the phase adjustor, and the phase signal is fed back to the phase adjustor.

8. The digital coherent receiver according to claim 1, further comprising:
a frequency variable oscillator to generate a clock signal supplied to the digital converter,
wherein the phase signal is input to the frequency variable oscillator.

9. A phase control method comprising:
sampling a signal received from an optical transmission path to generate a digital signal;
inputting the digital signal to two or more filters with different equalization characteristics;
detecting a phase of an output signal from each of the filters to generate phase detection signals and sensitivity monitoring signals representing sensitivities of the associated phase detections;
generating a sensitivity correction coefficient to correct the associated phase detection sensitivity using a square sum of the sensitivity monitoring signals;
combining the sensitivity-corrected phase detection signals subjected to sensitivity corrections using the sensitivity correction coefficients to output a phase signal; and
adjusting a sampling phase of the digital signal using the phase signal.

10. The phase control method according to claim 9, wherein the generation of the sensitivity correction coefficient includes
calculating the square sum using all the sensitivity monitoring signals, and
multiplying an inverse of the square sum by the corresponding sensitivity monitoring signal to generate the sensitivity correction coefficient.

11. The phase control method according to claim 10, wherein the generation of the sensitivity correction coefficient includes
multiplying the inverse of the square sum by a division result dividing the corresponding sensitivity monitoring signal by an absolute value of the sensitivity monitoring signal to generate the sensitivity correction coefficient.

12. The phase control method according to claim 10, wherein the generation of the sensitivity correction coefficient includes
multiplying the inverse of the square sum by a product of a square of the corresponding sensitivity monitoring signal and a sign of the sensitivity monitoring signal to generate the sensitivity correction coefficient.

13. The phase control method according to claim 9, wherein the generation of the sensitivity monitoring signal includes
shifting the phase of the output signal from the corresponding filter by a predetermined amount to a first direction to produce a first-direction phase-shifted signal, and
detecting and outputting a phase of the first-direction phase-shifted signal as the sensitivity monitoring signal.

14. The phase control method according to claim 13, wherein the generation of the sensitivity monitoring signal further includes
shifting the phase of the output signal from the corresponding filter by a predetermined amount to a second direction opposite to the first direction to produce a second-direction phase-shifted signal, and
detecting a phase of the second-direction phase-shifted signal, and
outputting a difference between the phase of the first-direction phase-shifted signal and the phase of the second-direction phase-shifted signal as the sensitivity monitoring signal.

15. The phase control method according to claim 9, wherein the adjustment of the sampling phase is carried out prior to the inputting of the digital signal to said two or more filters, and
wherein the phase signal is fed back for the adjustment of the sampling phase.

16. The phase control method according to claim 9, further comprising:
generating a clock for generating the digital signal,
wherein the phase signal is used to control the generation of the clock.

* * * * *